(12) United States Patent
Kim et al.

(10) Patent No.: US 9,310,546 B2
(45) Date of Patent: Apr. 12, 2016

(54) BACKLIGHT UNIT AND DISPLAY DEVICE HAVING THE SAME

(71) Applicant: Samsung Display Co., Ltd., Yongin, Gyeonggi-Do (KR)

(72) Inventors: Dohun Kim, Masan-si (KR); Jiwon Lee, Hwaseong-si (KR); Seong-Yong Hwang, Asan-si (KR); Hyun-Hwa Song, Suwon-si (KR); Sangheon Ye, Cheonan-si (KR); Sang Hoon Lee, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 276 days.

(21) Appl. No.: 14/146,294

(22) Filed: Jan. 2, 2014

(65) Prior Publication Data
US 2015/0029751 A1  Jan. 29, 2015

(30) Foreign Application Priority Data

Jul. 24, 2013 (KR) .................. 10-2013-0087550

(51) Int. Cl.
*F21V 8/00* (2006.01)
(52) U.S. Cl.
CPC .................. *G02B 6/0025* (2013.01)
(58) Field of Classification Search
CPC .................................................. G02B 6/0025
See application file for complete search history.

(56) References Cited

U.S. PATENT DOCUMENTS

| 7,920,221 | B2 | 4/2011 | Chang |
| 8,373,819 | B2 | 2/2013 | Lee et al. |
| 8,400,582 | B2 | 3/2013 | Kweon et al. |
| 2002/0109805 | A1* | 8/2002 | Baba ................ G02F 1/133615 349/65 |
| 2003/0126243 | A1* | 7/2003 | Kudo ................ H04L 29/12254 709/222 |
| 2006/0227572 | A1* | 10/2006 | Chen ...................... G02B 6/009 362/633 |
| 2006/0243948 | A1 | 11/2006 | Ishiwa et al. |
| 2012/0230008 | A1 | 9/2012 | Ajichi et al. |

FOREIGN PATENT DOCUMENTS

| JP | 2005122057 B2 | 5/2005 |
| JP | 2011235461 A | 11/2011 |
| KR | 1020000002272 A | 1/2000 |
| KR | 1020040092072 A | 11/2004 |
| KR | 1020060001567 A | 1/2006 |
| KR | 1020070024056 A | 3/2007 |
| KR | 1020070073061 A | 7/2007 |
| KR | 1020070073505 A | 7/2007 |
| KR | 100811086 B1 | 3/2008 |
| KR | 1020080052775 A | 6/2008 |

(Continued)

*Primary Examiner* — David V Bruce
(74) *Attorney, Agent, or Firm* — Cantor Colburn LLP

(57) ABSTRACT

A backlight unit includes a light source which generates light, a light guide plate which guides the light substantially in an upward direction, a first frame member which holds the light source and diffuses the light traveling substantially in the upward direction between the light source and the light guide plate, a second frame member which holds the light guide plate, a third frame member which holds the light guide plate, a reflective plate disposed under the light guide plate and which reflect the light leaked downwardly from the light guide plate substantially to the upward direction, and an optical sheet disposed on the light guide plate and the first to third frame members and which diffuses the light provided from the first frame member and the light guide plate and condenses the light substantially in the upward direction.

37 Claims, 15 Drawing Sheets

(56) References Cited

FOREIGN PATENT DOCUMENTS

| KR | 20090122749 A | 12/2009 |
| KR | 1020100074746 A | 7/2010 |
| KR | 1020100086880 A | 8/2010 |
| KR | 1020110127387 A | 11/2011 |
| KR | 101135043 B1 | 4/2012 |
| KR | 1020120032205 A | 4/2012 |
| KR | 20120066338 A | 6/2012 |

* cited by examiner

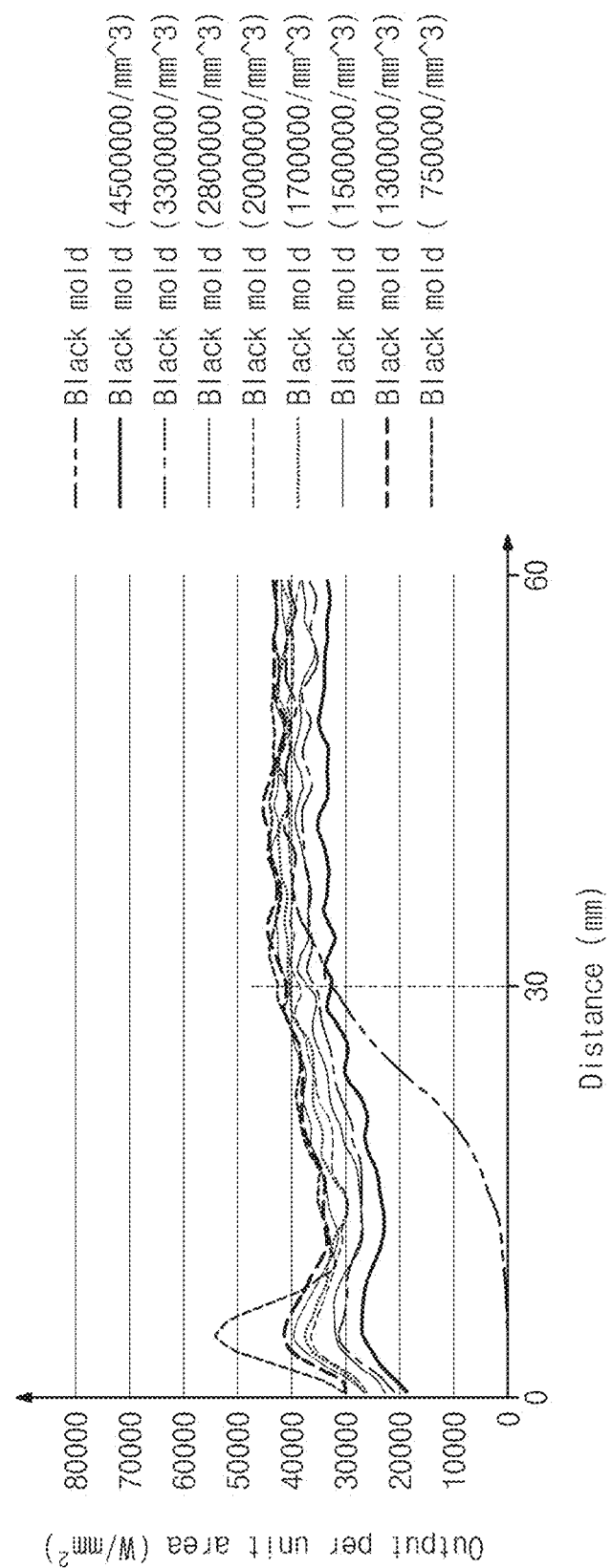

BACKLIGHT UNIT AND DISPLAY DEVICE HAVING THE SAME

This application claims priority to Korean Patent Application No. 10-2013-0087550, filed on Jul. 24, 2013, and all the benefits accruing therefrom under 35 U.S.C. §119, the content of which in its entirety is herein incorporated by reference.

BACKGROUND

1. Field

The disclosure relates to a backlight unit and a display device including the backlight unit. More particularly, the disclosure relates to a backlight unit which allows a display area of a display panel to expand and a display device including the backlight unit.

2. Description of the Related Art

In recent years, various types of display device, such as a liquid crystal display device, an electrowetting display device, an electrophoretic display device, etc., have been developed.

The display device typically includes a display panel to display an image and a backlight unit to provide light to the display panel. The display panel controls a transmittance of the light provided from the backlight unit to display the image.

The backlight unit is classified into an edge-illumination type backlight unit, which is disposed at a side portion of the display panel to provide the light to the display panel, and a direct-illumination type backlight unit, which is disposed under the display panel to provide the light to the display panel. The edge-illumination type backlight unit includes a light source that emits the light and a light guide plate that guides the light to the display panel. The light guide plate is disposed under the display panel. The light source is disposed to face a side surface of the light guide plate. The light emitted from the light source is incident to the light guide plate, and the light guide plate guides the light from the light source to the display panel.

SUMMARY

The disclosure provides a backlight unit which allows a display area of a display panel to expand.

The disclosure provides a display device including the backlight unit.

An exemplary embodiment of the invention provides a backlight unit including a light source which generates light, a light guide plate which guides the light from the light source substantially in an upward direction, a first frame member which holds the light source and diffuses the light traveling substantially to the upward direction between the light source and the light guide plate, a second frame member which holds the light guide plate, a third frame member which holds the light guide plate, a reflective plate disposed under the light guide plate, where the reflective plate reflects the light leaked downwardly from the light guide plate substantially to the upward direction, and an optical sheet disposed on the light guide plate and the first to third frame members, where the optical sheet diffuses the light provided from the first frame member and the light guide plate and condenses the light substantially in the upward direction.

In an exemplary embodiment, the first frame member may include a first extension part which holds the light source, a predetermined area of one side portion of the light guide plate in a first direction may overlap the first extension part, and the first extension part may extend in a second direction, which is substantially vertical to the first direction.

In an exemplary embodiment, the first extension part may include a first_first extension part having a long side in the second direction, a short side in a third direction, which is substantially vertical to the first and second directions, and a first height in the third direction, a first_second extension part connected to an inner surface of the first_first extension part and having a long side in the second direction and a short side in the first direction, a first inclination part connected to the first_second extension part, and a first reflective member disposed on a lower surface of the first_second extension part. In such an embodiment, one side surface of the first_second extension part in the first direction is spaced apart downwardly from an upper portion of the first_first extension part by a second height, which is less than the first height, and connected to the inner surface of the first_first extension part, the other side surface of the first_second extension part in the first direction is connected to one side surface of the first inclination part, and the other side surface of the first inclination part is inclined downwardly at a predetermined angle with respect to the first direction.

In an exemplary embodiment, the light source may be connected to the inner surface of the first_first extension part under the first_second extension part, and a predetermined area of the first_second extension part and the first inclination part may be disposed to overlap the predetermined area of the one side portion of the light guide plate in the first direction.

In an exemplary embodiment, the first_second extension part may include a resin mold member and a plurality of diffusion members accommodated in the resin mold member and having a refractive index different from a refractive index of the resin mold member.

In an exemplary embodiment, the resin mold member may include polycarbonate and the diffusion members include silicon particles.

In an exemplary embodiment, a density of the diffusion members may be in a range of about 1,300,000 particles per cubic millimeter ($/mm^3$) to about 2,000,000 particles/$mm^3$.

In an exemplary embodiment, the light source may be spaced apart from one side surface of the light guide plate in the first direction by a first distance, and the first reflective member may extend from the one side surface of the light guide plate toward the light source by a second distance corresponding to a half of the first distance and extended from the one side surface of the light guide plate in a direction, which is farther away from the light source, by a third distance, which is greater than the second distance.

In an exemplary embodiment, the first reflective member may include a titanium dioxide.

In an exemplary embodiment, a light uniformity in an area between a light incident part in which the light source is disposed and a point spaced apart from the light incident part by about 30 millimeters (mm) is equal to or greater than about 70%, and the light uniformity may be obtained by dividing a maximum intensity of illumination by a minimum intensity of illumination.

In an exemplary embodiment, the third frame member may be disposed under the second frame member to overlap the second frame member, and a predetermined area of the other side portion of the light guide plate in the first direction and predetermined areas of both side portions of the light guide plate in the second direction may be disposed and held between the second frame member and the third frame member.

In an exemplary embodiment, the second frame member may include a second extension part which extends in the second direction and is disposed to face the first extension part, and third and fourth extension parts which are connected to both ends of the second extension part, extend in the first direction to be disposed adjacent to both ends of the first extension part, and are disposed to face each other. In such an embodiment, the third frame member may include a fifth extension part which extends in the second direction, and sixth and seventh extension parts which are connected to both ends of the fifth extension part, extend in the first direction to be disposed adjacent to both ends of the first extension part, and are disposed to face each other. In such an embodiment, the fifth extension part may be disposed under the second extension part to overlap the second extension part, the sixth extension part may be disposed under the third extension part to overlap the third extension part, and the seventh extension part may be disposed under the fourth extension part to overlap the fourth extension part.

In an exemplary embodiment, the second extension part may include a second_first extension part disposed to face the first_first extension part and having the first height in the third direction, a long side in the second direction and a short side in the third direction, a second_second extension part connected to an inner surface of the second_first extension part and having a long side in the second direction and a short side in the first direction, and a second inclination part connected to the second_second extension part. In such an embodiment, the third extension part may include a third_first extension part having the first height in the third direction, a long side in the first direction, and a short side in the third direction, a third_second extension part connected to an inner surface of the third_first extension part and having a long side in the first direction and a short side in the second direction, and a third inclination part connected to the third_second extension part. In such an embodiment, the fourth extension part may include a fourth_first extension part having the first height in the third direction, a long side in the first direction and a short side in the third direction, a fourth_second extension part connected to an inner surface of the fourth_first extension part and having a long side in the first direction and a short side in the second direction, and a fourth inclination part connected to the fourth_second extension part.

In an exemplary embodiment, a side surface of the second_second extension part in the first direction may be spaced apart downwardly from an upper portion of the second_first extension part by the second height and connected to the inner surface of the second_first extension part, the other side surface of the second_second extension part in the first direction may be connected to one side surface of the second inclination part, the other side surface of the second inclination part in the first direction is inclined downwardly by a predetermined angle with respect to the first direction, one side surface of the third_second extension part in the second direction may be spaced apart downwardly from an upper portion of the third_first extension part by the second height and connected to the inner surface of the third_first extension part, the other side surface of the third_second extension part in the second direction may be connected to one side surface of the third inclination part, the other side surface of the third inclination part in the second direction may be inclined downwardly by a predetermined angle with respect to the second direction, one side surface of the fourth_second extension part in the second direction may be spaced apart downwardly from an upper portion of the fourth_first extension part by the second height and connected to the inner surface of the fourth_first extension part, the other side surface of the fourth_second extension part in the second direction may be connected to one side surface of the fourth inclination part, and the other side surface of the fourth inclination part in the second direction may be inclined downwardly by a predetermined angle with respect to the second direction.

In an exemplary embodiment, the fifth extension part may include a fifth_first extension part having a long side in the second direction and a short side in the third direction and a fifth_second extension part connected to a lower portion of an inner surface of the fifth_first extension part and having a long side in the second direction and a short side in the first direction. In such an embodiment, the sixth extension part may include a sixth_first extension part having a long side in the first direction and a short side in the third direction and a sixth_second extension part connected to a lower portion of an inner surface of the sixth_first extension part and having a long side in the first direction and a short side in the second direction. In such an embodiment, the seventh extension part may include a seventh_first extension part having a long side in the first direction and a short side in the third direction and a seventh_second extension part connected to a lower portion of an inner surface of the seventh_first extension part and having a long side in the first direction and a short side in the second direction.

In an exemplary embodiment, the backlight unit may further include a second reflective member disposed on each of the inner surface of the sixth_first extension part and the inner surface of the seventh_first extension part, and the fifth_second extension part, the sixth_second extension part and the seventh_second extension part are substantially vertically disposed on the fifth_first extension part, the sixth_first extension part and the seventh_first extension part, respectively.

In an exemplary embodiment, the backlight unit may further include a second reflective member disposed on an inclination surface of the sixth_first extension part and an inclination surface of the seventh_first extension part. In such an embodiment, the inner surface of the sixth_first extension part, which does not overlap the sixth_second extension part, may include the inclination surface inclined outward from the sixth_first extension part at a predetermined angle with respect to the upward direction, the inner surface of the seventh_first extension part, which does not overlap the seventh_second extension part, may include the inclination surface inclined outward from the seventh_first extension part at a predetermined angle with respect to the upward direction, and the inclination surface of the sixth_second extension part and the inclination surface of the seventh_second extension part may be inclined at the predetermined angle of about 30 degrees to about 60 degrees with respect to the upward direction.

In an exemplary embodiment, an upper surface and an outer surface of the fifth_first extension part may be respectively disposed on a lower surface of the second_second extension part and the inner surface of the second_first extension part under the second_second extension part, an upper surface and an outer surface of the sixth_first extension part may be respectively disposed on a lower surface of the third_second extension part and the inner surface of the third_first extension part under the third_second extension part, and an upper surface and an outer surface of the seventh_first extension part may be respectively disposed on a lower surface of the fourth_second extension part and the inner surface of the fourth_first extension part under the fourth_second extension part.

In an exemplary embodiment, the predetermined area of the other side portion of the light guide plate in the first direction may be disposed on the fifth_second extension part, the second_second extension part may be disposed on the predetermined area of the other side portion of the light guide plate in the first direction, the predetermined areas of the both side portions of the light guide plate in the second direction may be respectively disposed on the sixth_second extension part and the seventh_second extension part, and the third_second extension part and the fourth_second extension part may be respectively disposed on the predetermined areas of the both side portions of the light guide plate in the first direction.

In an exemplary embodiment, predetermined areas of both side portions of the optical sheet in the first direction may be respectively disposed on the first_second extension part and the second_second extension part, and the predetermined areas of the both side portions of the optical sheet in the second direction may be respectively disposed on the third_second extension part and the fourth_second extension part.

In an exemplary embodiment, the backlight unit may further include a plurality of scattering patterns disposed on a lower surface and arranged substantially in a matrix form, where the scattering patterns reflects and diffuse the light incident thereto.

In an exemplary embodiment, the scattering patterns may include a plurality of first scattering patterns arranged in both side portions of the light guide plate in the second direction vertical to the first direction and a plurality of second scattering patterns arranged between the both side portions of the light guide plate, and the second scattering patterns may have a size which gradually becomes larger along the first direction.

In an exemplary embodiment, the first scattering patterns may have a size larger than the largest size of the second scattering patterns.

In an exemplary embodiment, the first scattering patterns may have a size which gradually becomes larger along the first direction, and the first scattering patterns arranged in a same column as the second scattering patterns in the second direction may have the size greater than the size of the second scattering patterns arranged in the same column.

Another exemplary embodiment of the invention provides a display device includes a display panel which controls a transmittance of light provided thereto to display an image and a backlight unit disposed under the display panel to provide the light to the display panel. In such an embodiment, the backlight unit includes a light source which generates the light, a light guide plate which guides the light substantially in an upward direction, a first frame member which holds the light source and diffuses the light traveling in the upward direction between the light source and the light guide plate, a second frame member which holds the light guide plate, a third frame member which holds the light guide plate, a reflective plate disposed under the light guide plate, where the reflective plate reflects the light leaked downwardly from the light guide plate substantially to the upward direction, and an optical sheet disposed on the light guide plate and the first to third frame members, where the optical sheet diffuses the light provided from the first frame member and the light guide plate and condenses the light substantially in the upward direction.

According to exemplary embodiments of the invention described herein, the display area of the display device may be expanded by the backlight unit.

BRIEF DESCRIPTION OF THE DRAWINGS

The above and other features of the disclosure will become more apparent by describing in further detail exemplary embodiments thereof with reference to the accompanying drawings, in which:

FIG. 7 is a graph of output per unit area versus position in a diffusion member according to density of diffusion members;

DETAILED DESCRIPTION

Figure 1:
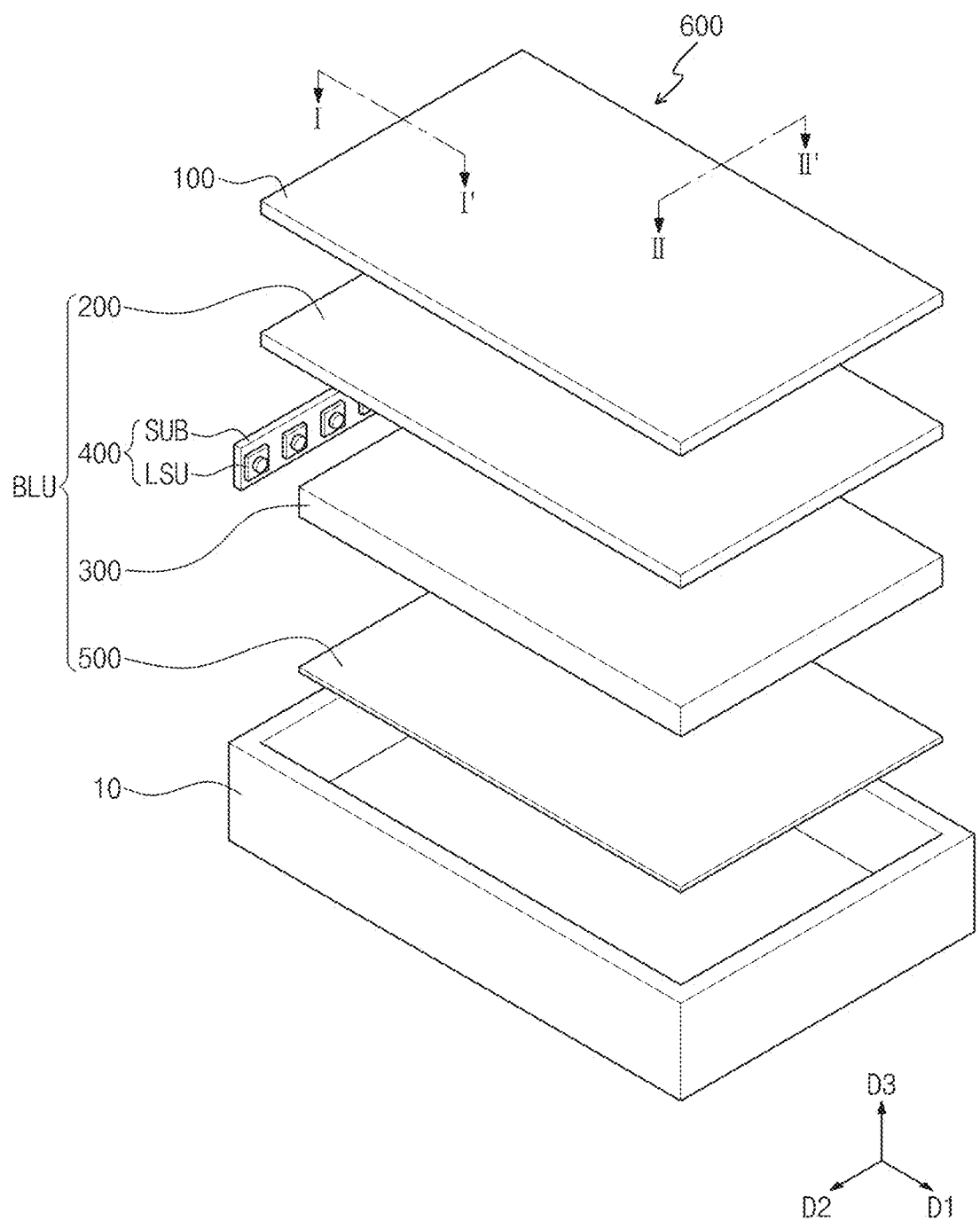
FIG. 1 is an exploded perspective view of an exemplary embodiment of a display device, according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

Hereinafter, exemplary embodiments of the invention will be described in detail with reference to the accompanying drawings.

Figure 2:
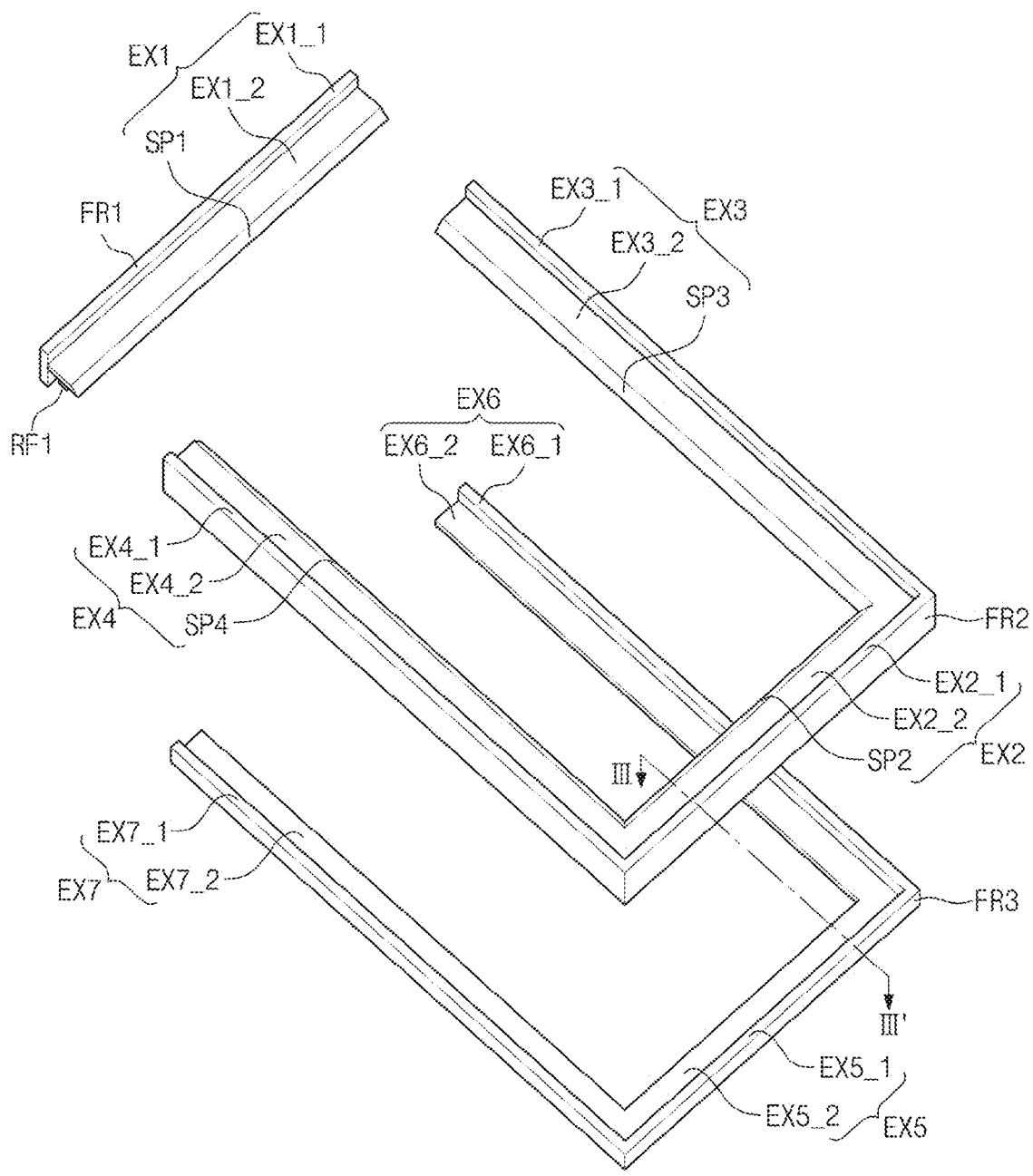
FIG. 2 is an exploded perspective view of an exemplary embodiment of frame members accommodated in a protective member shown in FIG. 1.
Figure 3:
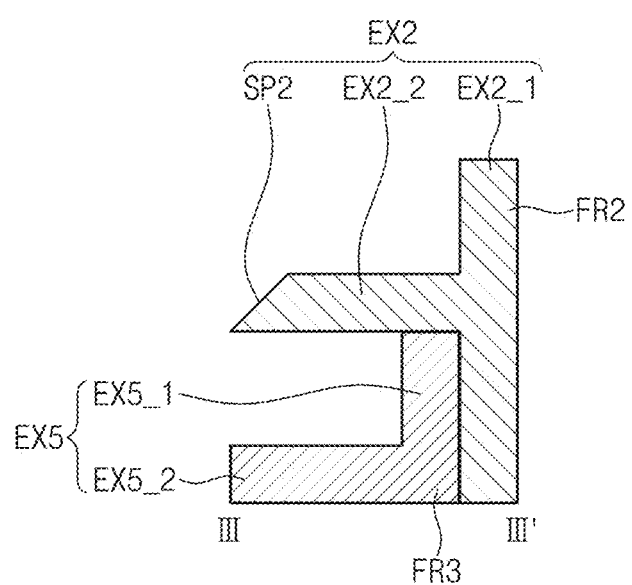
FIG. 3 is a cross-sectional view taken along line III-III' of FIG. 2, showing an exemplary embodiment of second and third frame members coupled to each other.
Figure 4:
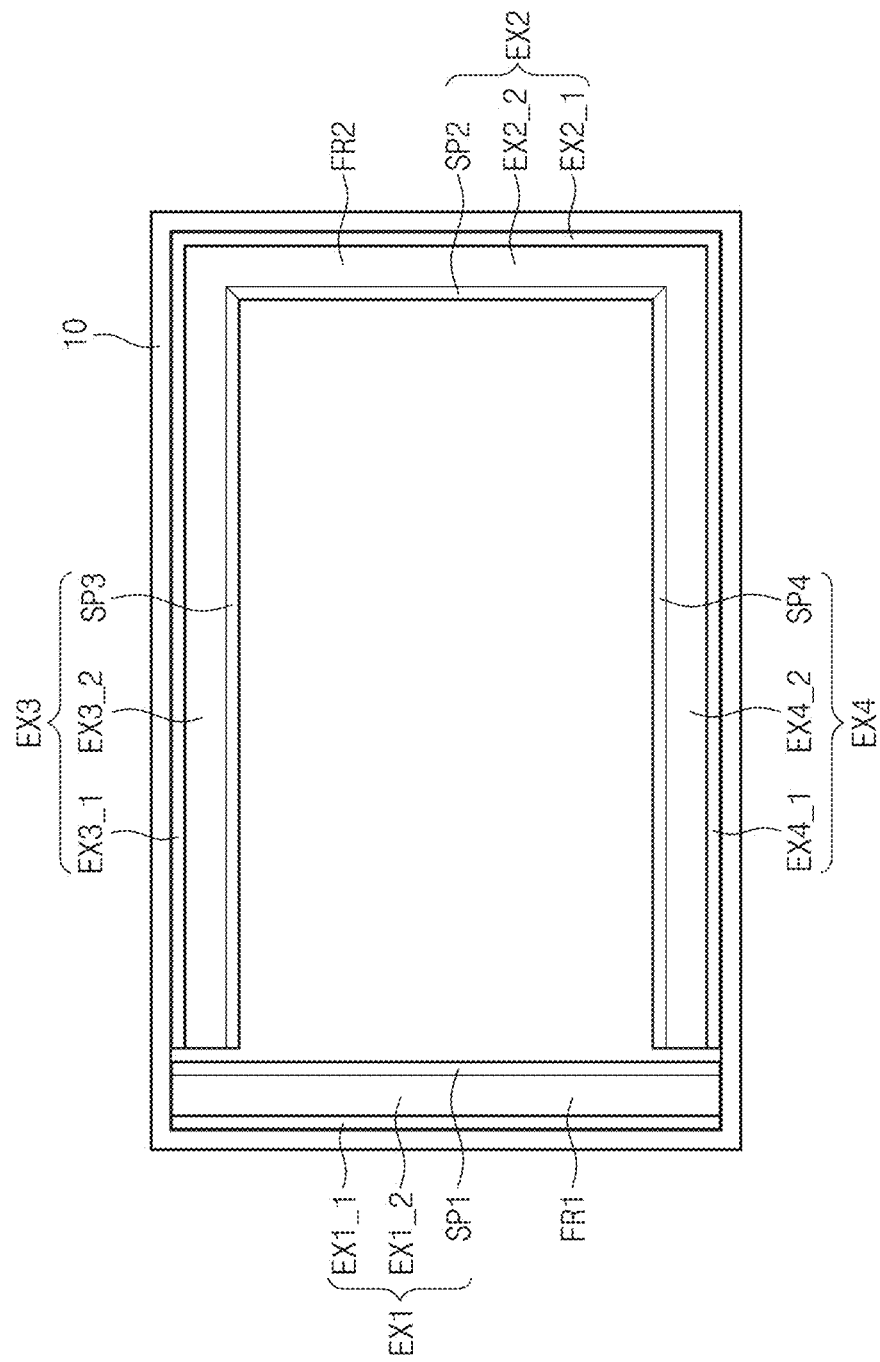
FIG. 4 is a top plan view of an exemplary embodiment of the frame members accommodated in the protective member.

FIG. 1 is an exploded perspective view of an exemplary embodiment of a display device, according to the invention, FIG. 2 is an exploded perspective view of an exemplary embodiment of frame members accommodated in a protective member shown in FIG. 1, FIG. 3 is a cross-sectional view taken along line III-III' of FIG. 2, showing an exemplary embodiment of second and third frame members coupled to each other, and FIG. 4 is a top plan view of an exemplary embodiment of the frame members accommodated in the protective member.

Referring to FIGS. 1 to 4, an exemplary embodiment of a display device 600 includes a display panel 100, a backlight unit BLU that provides light to the display panel 100, and a protective member 10 that accommodates and protects the display panel 100 and the backlight unit BLU.

The display panel 100 has a rectangular shape when viewed in a plan view. The display panel 100 has long sides disposed along a first direction D1 and short sides disposed along a second direction D2 substantially perpendicular to the first direction D1. Hereinafter, a direction substantially perpendicular to the first and second directions D1 and D2 is referred to as a third direction D3. That is, the third direction D3 is vertical to a plane surface defined by the first direction D1 and the second direction D2. The display panel 100 controls a transmittance of the light provided from the backlight unit BLU to display an image.

The display panel 100 may be a liquid crystal display panel, an electrophoretic display panel, or an electrowetting display panel.

In an exemplary embodiment, where the liquid crystal display panel is the display panel 100, the liquid crystal display panel 100 includes a first substrate (not shown), a second substrate (not shown) disposed to face the first substrate, and a liquid crystal layer (not shown) disposed between the first substrate and the second substrate.

The backlight unit BLU is disposed at a rear side of the display panel 100. The backlight unit BLU generates the light. The light generated by the backlight unit BLU is provided to the display panel 100. As described above, the display panel 100 controls the transmittance of the light provided thereto to display the image.

The backlight unit BLU includes an optical sheet 200, a light guide plate 300, a light source 400, a reflective plate 500 and frame members FR1, FR2 and FR3.

The optical sheet 200 is disposed under the display panel 100. The optical sheet 200 diffuses the light provided from one of the frame members FR1, FR2 and FR3, and the light guide plate 300, and condenses the light in an upward direction substantially vertical to the plane surface.

The optical sheet 200 includes a prism sheet (not shown) disposed under the display panel 100 and a diffusion sheet (not shown) disposed under the prism sheet. The diffusion sheet diffuses the light provided from the light guide plate. The prism sheet condenses the diffused light by the diffusion sheet in the upward direction such that the light exiting from the prism sheet may travel in a direction substantially perpendicular to the display panel 100 with substantially uniform brightness.

The light guide plate 300 and the light source 400 are disposed under the optical sheet 200. A side surface of the light guide plate 300 is disposed face the light source 400. The light source 400 is disposed adjacent to the side surface of the light guide plate 300 and emits the light. The light guide plate 300 guides the light emitted from the light source 400 to the display panel 100, and thus the light guided by the light guide plate 300 is provided to the optical sheet 200.

The light source 400 includes a substrate SUB and a plurality of light source units LSU disposed, e.g., mounted, on the substrate SUB. The substrate SUB includes one or more insulating layer (not shown) and one or more circuit layer (not shown).

The light source units LSU receive a dimming signal and a driving voltage from the circuit layer of the substrate SUB, and generate the light based on the dimming signal and the driving voltage. The light source units LSU are arranged substantially along the second direction D2 and spaced apart from each other with a predetermined interval. The light source units LSU are disposed to face the side surface of the light guide plate 300, and emit the light to the light guide plate 300.

The light guide plate 300 is disposed adjacent to the light source units LSU. The light guide plate 300 changes the traveling direction of the light such that the light emitted from the light source units LSU travels toward the display panel 100 disposed on the backlight unit BLU.

The reflective plate 500 is disposed under the light guide plate 300, and reflects the light leaked downwardly from the light guide plate 300 toward the upward direction.

The frame members FR1, FR2 and FR3 may include a resin. In such an embodiment, the frame members FR1, FR2 and FR3 may include a material with high transmittance. In one exemplary embodiment, for example, the frame members FR1, FR2 and FR3 may include polycarbonate.

The frame members FR1, FR2 and FR3 include a first frame member FR1, a second frame member FR2 and a third frame member FR3.

The light source 400 is connected to and held by the first frame member FR1. The first frame member FR1 diffuses the light traveling upwardly through a space between the light source 400 and the light guide plate 300.

The second and third frame members FR2 and FR3 hold the light guide plate 300. The optical sheet 200 is placed on the third frame member FR3. These configurations will be described later in greater detail with reference to FIGS. 5 and 10.

The first frame member FR1 is disposed on an inner surface of one side of the protective member 10 in the first direction D1. The second frame member FR2 is disposed on an inner surface of the other side of the protective member 10 in the first direction D1 and inner surfaces of both side portions of the protective member 10 in the second direction D2. The third frame member FR3 is disposed under the second frame member FR2. The third frame member FR3 is disposed to overlap the second frame member FR2.

As shown in FIG. 4, the second frame member FR2 is disposed adjacent to the first frame member FR1 in the first direction D1. In such an embodiment, the third frame member FR3 is disposed to overlap the second frame member FR2, and the third frame member FR3 is not shown in FIG. 4. In such an embodiment, the third frame member FR3 is disposed adjacent to the first frame member FR1 in the first direction D1.

The first frame member FR1 includes a first extension part EX1 that extends substantially in the second direction D2. An outer surface of the first extension part EX1 is disposed to be in contact with the inner surface of the one side of the protective member 10. This configuration will be described later in greater detail with reference to FIG. 5.

The second frame member FR2 includes a second extension part EX2, a third extension part EX3 and a fourth extension part EX4. The second extension part EX2 extends substantially in the second direction D2 and disposed to face the first extension part EX 1.

The third extension part EX3 and the fourth extension part EX4 are connected to both ends of the second extension part EX2, respectively, and each extends substantially in the first direction D1 to be adjacent to both ends of the first extension part EX1, respectively. In such an embodiment, one end of the third extension part EX3 and one end of the fourth extension part EX4 are disposed adjacent to the both ends of the first extension part EX1, respectively, in the first direction D1. The other end of the third extension part EX3 and the other end of the fourth extension part EX4, which are extend substantially in the first direction D1, are connected to the both ends of the second extension part EX2, respectively. The third extension part EX3 and the fourth extension part EX4 are disposed to face each other.

An outer surface of the second extension part EX2 is in contact with the inner surface of the other side of the protective member 10. An outer surface of the third extension part EX3 and an outer surface of the fourth extension part EX4 are in contact with the inner surfaces of the both side portions of the protective member 10 in the second direction D2. These configurations will be described later in greater detail with reference to FIG. 10.

The third frame member FR3 includes a fifth extension part EX5, a sixth extension part EX6 and a seventh extension part EX7. The fifth extension part EX5 extends substantially in the second direction D2.

The sixth extension part EX6 and the seventh extension part EX7 are connected to both ends of the fifth extension part EX5, respectively, and each extends substantially in the first direction D1 to be adjacent to both ends of the first extension part EX1, respectively. In such an embodiment, one end of the sixth extension part EX6 and one end of the seventh extension part EX7 are disposed adjacent to the both ends of the first extension part EX1, respectively, in the first direction D1. The other end of the sixth extension part EX6 and the other end of the seventh extension part EX7, which extend substantially in the first direction D1, are connected to the both ends of the fifth extension part EX5, respectively. The sixth extension part EX6 and the seventh extension part EX7 are disposed to face each other.

The fifth extension part EX5 is disposed under the second extension part EX2 to overlap the second extension part EX2. The sixth extension part EX6 and the seventh extension part EX7 are disposed under the third extension part EX3 and the fourth extension part EX4, respectively, to overlap the third extension part EX3 and the fourth extension part EX4, respectively.

A predetermined area of one side portion of the light guide plate 300 along the second direction D2 overlaps the first extension part EX1 and does not overlap the second and third frame members FR2 and FR3. These configurations will be described later in greater detail with reference to FIGS. 5, 10 and 11.

The first extension part EX1 includes a first_first extension part EX1_1, a first_second extension part EX1_2, a first inclination part SP1 and a first reflective member RF 1. Each of the first_first extension part EX1_1, the first_second extension part EX1_2, the first inclination part SP1 and the first reflective member RF 1 extends substantially in the second direction D2.

The first_first extension part EX1_1 has a long side in the second direction D2 and a short side in the third direction D3. The first_second extension part EX1_2 has a long side in the second direction D2 and a short side in the first direction D1.

In such an embodiment, one side surface of the first_second extension part EX1_2 along the second direction D2 is connected to an inner surface of the first_first extension part EX1_1. In one exemplary embodiment, for example, one side surface of the first_second extension part EX1_2 along the first direction D1 is disposed substantially vertical to the inner surface of the first_first extension part EX1_1 and connected to the inner surface of the first_first extension part EX1_1.

In such an embodiment, the other side surface of the first_second extension part EX1_2 along the second direction D2 is connected to one side surface of the first inclination part SP1. The first inclination part SP1 has a predetermined inclination surface in the first direction D1. In such an embodiment, the other side surface of the first inclination part SP1 is inclined downwardly with respect to the first direction D1 at a predetermined angle. The first reflective member RF1 is disposed on a lower surface of the first_second extension part EX1_2.

The second extension part EX2 includes a second_first extension part EX2_1, a second_second extension part EX2_2 and a second inclination part SP2. Each of the second_first extension part EX2_1, the second_second extension part EX2_2 and the second inclination part SP2 extends substantially in the second direction D2.

The second_first extension part EX2_1 is disposed to face the first_first extension part EX1_1. The second_first extension part EX2_1 has a long side in the second direction D2 and a short side in the third direction D3. The second_second extension part EX2_2 has a long side in the second direction D2 and a short side in the first direction D1.

In such an embodiment, one side surface of the second_second extension part EX2_2 along the second direction D2 is connected to an inner surface of the second_first extension part EX2_1. In one exemplary embodiment, for example, one side surface of the second_second extension part EX2_2 along the second_first D1 is disposed substantially vertical to the inner surface of the second_first extension part EX2_1 and connected to the inner surface of the second_first extension part EX2_1.

In such an embodiment, the other side surface of the second_second extension part EX2_2 along the second direction D2 is connected to one side surface of the second inclination part SP2. The second inclination part SP2 has a predetermined inclination surface in the first direction D1. In such an embodiment, the other side surface of the second inclination part SP2 is inclined downwardly with respect to the first direction D1 at a predetermined angle.

The third extension part EX3 includes a third_first extension part EX3_1, a third_second extension part EX3_2 and a third inclination part SP3. Each of the third_first extension part EX3_1, the third_second extension part EX3_2 and the third inclination part SP3 extends substantially in the first direction D1.

The third_first extension part EX3_1 has a long side in the first direction D1 and a short side in the third direction D3. The third_second extension part EX3_2 has a long side in the first direction D1 and a short side in the second direction D2.

In such an embodiment, one side surface of the third_second extension part EX3_2 along the first direction D1 is connected to an inner surface of the third_first extension part EX3_1. In one exemplary embodiment, for example, one side surface of the third_second extension part EX3_2 along the second direction D2 is disposed substantially vertical to the inner surface of the third_first extension part EX3_1 and connected to the inner surface of the third_first extension part EX3_1.

In such an embodiment, the other side surface of the third_second extension part EX3_2 along the first direction D1 is connected to one side surface of the third inclination part SP3. The third inclination part SP3 has a predetermined inclination surface in the second direction D2. In such an embodiment, the other side surface of the third inclination part SP3 along the first direction D1 is inclined downwardly with respect to the second direction D2 at a predetermined angle.

The fourth extension part EX4 includes a fourth_first extension part EX4_1, a fourth_second extension part EX4_2 and a fourth inclination part SP4. Each of the fourth_first extension part EX4_1, the fourth_second extension part EX4_2 and the fourth inclination part SP4 extends substantially in the first direction D1.

The fourth_first extension part EX4_1 has a long side in the first direction D1 and a short side in the third direction D3. The fourth_second extension part EX4_2 has a long side in the first direction D1 and a short side in the second direction D2.

In such an embodiment, one side surface of the fourth_second extension part EX4_2 along the first direction D1 is connected to an inner surface of the fourth_first extension part EX4_1. In one exemplary embodiment, for example, one side surface of the fourth_second extension part EX4_2 in the second direction D2 is disposed substantially vertical to the inner surface of the fourth_first extension part EX4_1 and connected to the inner surface of the fourth_first extension part EX4_1.

In such an embodiment, the other side surface of the fourth_second extension part EX4_2 along the first direction D1 is connected to one side surface of the fourth inclination part SP4. The fourth inclination part SP4 has a predetermined inclination surface in the second direction D2. In such an embodiment, the other side surface of the fourth inclination part SP4 is inclined downwardly with respect to the second direction D2 at a predetermined angle.

The third_first extension part EX3_1 and the fourth_first extension part EX4_1 are disposed to face each other, the third_second extension part EX3_2 and the fourth_second extension part EX4_2 are disposed to face other, and the third inclination part SP3 and the fourth inclination part SP4 are disposed to face each other.

The fifth extension part EX5 includes a fifth_first extension part EX5_1 and a fifth_second extension part EX5_2. Each of the fifth_first extension part EX5_1 and the fifth_second extension part EX5_2 extends substantially in the second direction D2.

The fifth_first extension part EX5_1 includes a long side in the second direction D2 and a short side in the third direction D3. The fifth_second extension part EX5_2 has a long side in the second direction D2 and a short side in the first direction D1. Herein, a side in a first or second direction D1 or D2 means a side substantially parallel to the first or second direction D1 or D2. The fifth_second extension part EX5_2 is connected to a lower portion of the inner surface of the fifth_first extension part EX5_1.

The sixth extension part EX6 includes a sixth_first extension part EX6_1 and a sixth_second extension part EX6_2. Each of the sixth_first extension part EX6_1 and the sixth_second extension part EX6_2 extends substantially in the first direction D1.

The sixth_first extension part EX6_1 includes a long side in the first direction D1 and a short side in the third direction D3. The sixth_second extension part EX6_2 has a long side in the first direction D1 and a short side in the second direction D2. The sixth_second extension part EX6_2 is connected to a lower portion of the inner surface of the sixth_first extension part EX6_1.

The seventh extension part EX7 includes a seventh_first extension part EX7_1 and a seventh_second extension part EX7_2. Each of the seventh_first extension part EX7_1 and the seventh_second extension part EX7_2 extends substantially in the first direction D1.

The seventh_first extension part EX7_1 includes a long side in the first direction D1 and a short side in the third direction D3. The seventh_second extension part EX7_2 has a long side in the first direction D1 and a short side in the second direction D2. The seventh_second extension part EX7_2 is connected to a lower portion of the inner surface of the seventh_first extension part EX7_1.

The sixth_first extension part EX6_1 and the seventh_first extension part EX7_1 are disposed to face each other, and the sixth_second extension part EX6_2 and the seventh_second extension part EX7_2 are disposed to face each other.

The fifth_second extension part EX5_2, the sixth_second extension part EX6_2, and the seventh_second extension part EX7_2 are disposed substantially vertical to the inner surface of the fifth_first extension part EX5_1, the inner surface of the sixth_first extension part EX6_1, and the seventh_first extension part EX7_1, respectively.

In an exemplary embodiment, as shown in FIG. 3, an upper surface and an outer surface of the fifth_first extension part EX5_1 are respectively disposed on a lower surface of the second_second extension part EX2_2 and the inner surface of the second_first extension part EX2_1 under the second_second extension part EX2_2.

For the convenience of illustration, FIG. 3 shows only the cross-sectional view taken along line III-III' of FIG. 2 to show the second and third frame members FR2 and FR3 coupled to each other, but the sixth_first extension part EX6_1 and the seventh_first extension part EX7_1 are coupled to the second frame member FR2, similarly to the fifth_first extension part EX5_1. In one exemplary embodiment, for example, an upper surface and an outer surface of the sixth_first extension part EX6_1 are respectively disposed on a lower surface of the third_second extension part EX3_2 and the inner surface of the third_first extension part EX3_1 under the third_second extension part EX3_2. In such an embodiment, an upper surface and an outer surface of the seventh_first extension part EX7_1 are respectively disposed on a lower surface of the fourth_second extension part EX4_2 and the inner surface of the fourth_first extension part EX4_1 under the fourth_second extension part EX4_2.

Figure 5:
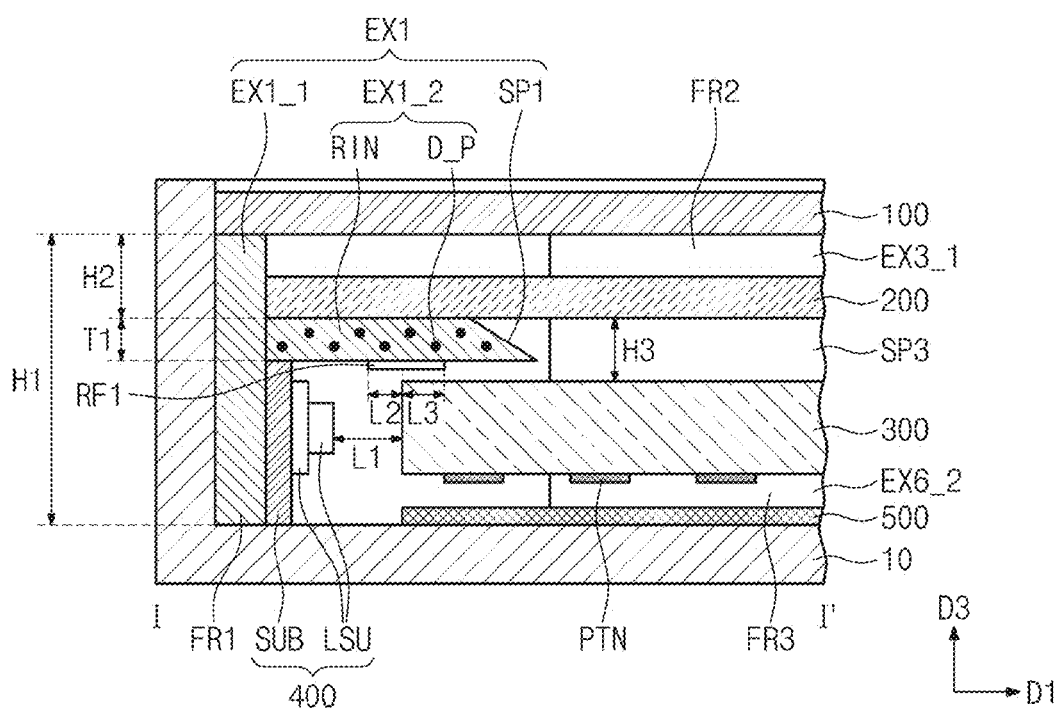
FIG. 5 is a cross-sectional view taken along line I-I' of the display device shown in FIG. 1, in which the frame members shown in FIG. 2 are accommodated in the protective member shown in FIG. 1.

FIG. 5 is a cross-sectional view taken along line I-I' of the display device shown in FIG. 1, in which the frame members shown in FIG. 2 are accommodated in the protective member shown in FIG. 1.

Referring to FIG. 5, the display panel 100, the optical sheet 200, the light guide plate 300, the light source 400, the reflective plate 500 and the first frame member FR1 are accommodated in the protective member 10.

In an exemplary embodiment, as described above, the optical sheet 200 is disposed under the display panel 100, the light guide plate 300 is disposed under the optical sheet 200, and the reflective plate 500 is disposed under the light guide plate 300. In such an embodiment, the light source 400 is disposed to face the one side surface of the light guide plate 300 along the second direction D2.

In an exemplary embodiment, as shown in FIG. 5, the outer surface of the first_first extension part EX1_1 of the first extension part EX1 is in contact with the inner surface of the one side of the protective member 10 in the first direction D1. The first extension part EX1_1 has a first height H1 in the third direction D3.

The first_second extension part EX1_2 is spaced apart downwardly from an upper portion of the first_first extension part EX1_1 by a second height H2 and connected to or extending from the inner surface of the first_first extension part EX1_1. The second height H2 is shorter than the first height H1.

A height different between an upper surface of the first_second extension part EX1_2 and an upper surface of the light guide plate 300 is referred to as a third height H3. The third height H3 is shorter than the second height H2.

The light source 400 is connected to the inner surface of the first_first extension part EX1_1 under the first_second extension part EX1_2. In such an embodiment, the substrate SUB of the light source 400 is connected to the first_first extension part EX1_1 under the second_first extension part EX2_1.

In such an embodiment, a predetermined area of the first_second extension part EX1_2 and the first inclination part SP1 are disposed to overlap the predetermined area of the one side surface of the light guide plate 300. The light source 400 is disposed to be spaced apart from the one side surface of the light guide plate 300 by a first distance L1 in the first direction D1. In such an embodiment, the light source unit LSU of the light source 400 is spaced apart from the one side surface of the light guide plate 300 by the first distance L1 in the first direction D1. The first_second extension part EX1_2 has a first thickness T1 in the third direction D3.

The first reflective member RF1 includes a material that reflects the light. In one exemplary embodiment, for example, the first reflective member RF1 includes a titanium dioxide (TiO2). The titanium dioxide (TiO2) reflects about 85% of the light incident thereto and transmits about 15% of the light incident thereto. The first reflective member RF 1 has a width of about 2 millimeters (mm) in the first direction D1.

The first reflective member RF1 is disposed under the first_second extension part EX1_2. The first reflective member RF1 extends to the light source 400 from the one side surface of the light guide plate 300 along the first direction D1 by a second distance L2 corresponding to a half of the first distance L1. In such an embodiment, the first reflective member RF1 extends in a direction away from the light source 400 along the first direction D1 by a third distance L3, which is greater than the second distance L2.

The first_second extension part EX1_2 includes a resin mold member RIN and a plurality of diffusion members D_P accommodated in the resin mold member RIN. The diffusion members D_P have a refractive index different from a refractive index of the resin mold member RIN. In one exemplary embodiment, for example, the resin mold member RIN includes polycarbonate, and the diffusion members D_P include silicon particles with the refractive index different from the refractive index of the polycarbonate.

The scattering patterns PTN are disposed on a lower surface of the light guide plate 300. The scattering patterns PTN reflect and diffuse the light incident thereto such that the light travels substantially upwardly.

In such an embodiment, a predetermined area of one side portion of the optical sheet 200 is disposed on the first_second extension part EX1_2. The predetermined area of one side portion of the display panel 100 is disposed on the first_first extension part EX1_1.

The structure in which the display panel 100, the optical sheet 200 and the light guide plate 300 are disposed on the second and third frame members FR2 and FR3 will be described later in greater detail with reference to FIGS. 10 and 11.

Figure 6:
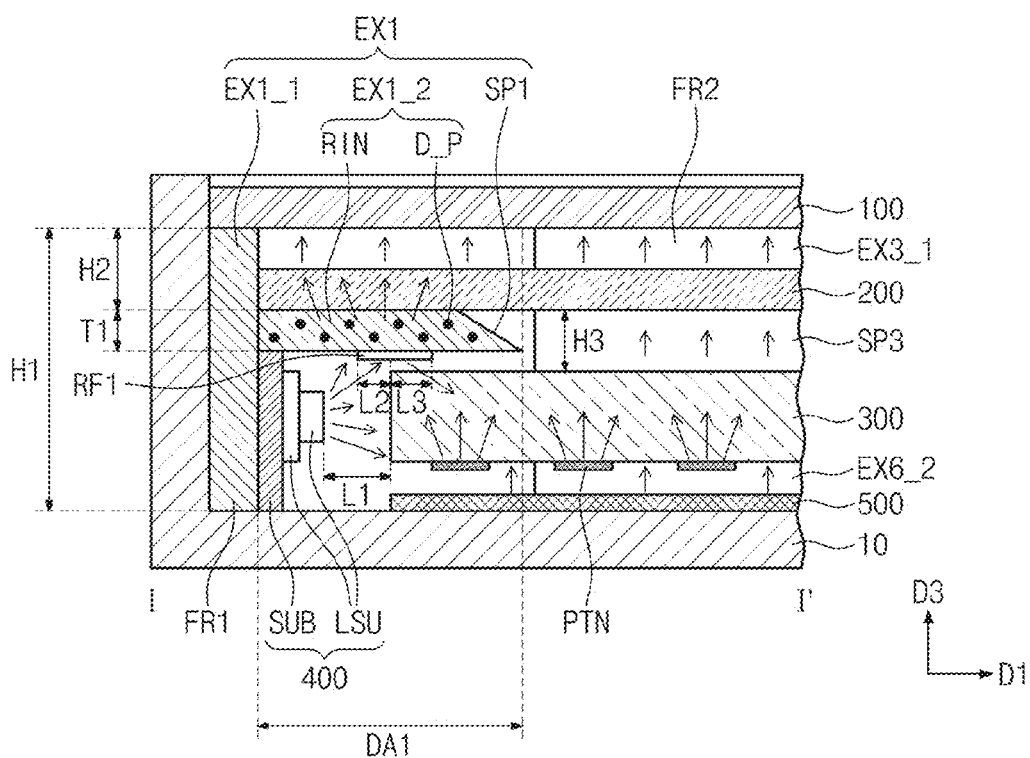
FIG. 6 is a cross-sectional view showing an optical path of the light in the display device shown in FIG. 5.

FIG. 6 is a cross-sectional view showing an optical path of the light in the display device shown in FIG. 5.

Referring to FIG. 6, the light emitted from the light source 400 is provided to the light guide plate 300. In an embodiment where the scattering patterns PTN are not disposed on the light guide plate 300, a portion of the light may be totally reflected by the light guide plate 300, and thus the portion of the light does not pass through the upper surface of the light guide plate 300.

In an exemplary embodiment, where the scattering patterns PTN are disposed on the light guide plate 300, the scattering patterns PTN change a total internal reflection condition at a boundary interface between the light guide plate 300 and an external air layer to effectively prevent the total reflection of the light in the light guide plate 300. Therefore, in such an embodiment, the light reflected and diffused by the scattering patterns PTN may pass substantially through the upper surface of the light guide plate 300. In such an embodiment, the light having substantially uniform brightness is provided to the upper portion of the light guide plate 300 by the scattering patterns PTN.

In such an embodiment, as described above, the reflective pattern 500 reflects the light leaked downwardly from the light guide plate 300 to the light guide plate 300.

A portion of the light emitted from the light source 400 travels in an upward direction between the light source 400 and the light guide plate 300 and is provided to the first_second extension part EX1_2 and the first reflective member RF1. The first_second extension part EX1_2 diffuses the light provided from the light source 400. In an exemplary embodiment, the light emitted from the light source 400 is diffused by the diffusion members D_P of the first_second extension part EX1_2.

The first reflective member RF1 reflects the light provided from the light source 400 in a downward direction. In such an embodiment, the first reflective member RF1 may reflect the light traveling in the upward direction in the predetermined area of the light guide plate 300, which is adjacent to the one side portion of the light guide plate 300, in the downward direction.

The light provided to the first_second extension part EX1_2 and the first reflective member RF1 from the light source 400 is diffused in the upward direction by the first_second extension part EX1_2 and reflected in the downward direction by the first reflective member RF1. Thus, the light traveling in the upward direction through the first_second direction EX1_2 and the light traveling in the upward direction through the light guide plate 300 may have substantially the same or uniform brightness across the optical sheet 200.

If the first reflective member RF1 is not provided, the light traveling in the upward direction through the first_second extension part EX1_2 may have the brightness higher than the light traveling in the upward direction through the light guide plate 300. In an exemplary embodiment, where the portion of the light provided from the light source 400 is reflected by the first reflective member RF1, the light traveling in the upward direction through the first_second direction EX1_2 and the light traveling in the upward direction through the light guide plate 300 may have substantially uniform brightness across the optical sheet 200.

In an exemplary embodiment, where the first reflective member RF1 is extended toward the light source 400 from the one side portion of the light guide plate 300 by the second distance L2 corresponding to the half of the first distance L1, the light traveling in the upward direction through the first_second direction EX1_2 and the light traveling in the upward direction through the light guide plate 300 may be effectively controlled to have substantially uniform brightness across the optical sheet 200.

In such an embodiment, a density of the diffusion members D_P of the first_second extension part EX1_2 may be controlled to allow the light traveling in the upward direction through the light guide plate 300 to have uniform brightness. In one exemplary embodiment, for example, the diffusion members D_P have the density (e.g., particle density) of about 1,300,000 per cubic millimeter (/mm$^3$) to about 2,000,000 particles/mm$^3$, that is, the diffusion members D_P may include particles, e.g., silicon particle, of about 1,300,000 to about 2,000,000 per unit volume (e.g., /mm$^3$).

In an exemplary embodiment, where the diffusion members D_P have the density of about 1,300,000/mm$^3$ to about 2,000,000/mm$^3$ and the first reflective member RF1 extends toward the light source 400 from the one side portion of the light guide plate 300 by the second distance L2 corresponding to the half of the first distance L1, the light traveling in the upward direction through the first_second direction EX1_2 and the light traveling in the upward direction through the light guide plate 300 may have substantially uniform brightness across the optical sheet 200.

The light traveling in the upward direction through the first_second extension part EX1_2 and the light guide plate 300 is provided to the optical sheet 200. The optical sheet 200 diffuses the light provided from the first_second extension part EX1_2 and the light guide plate 300 and condenses the light in the upward direction, and thus the light is provided to the display panel 100. The display panel 100 controls the transmittance of the light provided from the optical sheet 200 to display the image.

The area of the display panel 100, which overlaps the first frame member FR1, is referred to as a first display area DA1. When the first frame member FR1 may include a light absorbing material to effectively prevent a light leakage occurring between the light source 400 and the light guide plate 300, the light may not be effectively provided to the first display area DA1. Accordingly, the first display area DA1 of the display panel 100 is inactivated, such that the image is not displayed in the first display area DA1.

In an exemplary embodiment, the first frame member FR1 disposed between the light source 400 and the light guide plate 300 reflects and diffuses the light provided from the light source 400, and thus the light diffused and reflected by the first frame member FR1 and the light traveling in the upward direction through the light guide plate 300 may have substantially uniform brightness across the optical sheet 200. Therefore, the light is provided to the first display area DA1 of the display panel 100, such that the display area of the display panel 100, in which the image is displayed, may be expanded.

Accordingly, an exemplary embodiment of the display device 600 including the backlight unit BLU may have an expanded display area.

FIG. 7 is a graph of output per unit area versus position in a diffusion member according to density of the diffusion members.

In FIG. 7, a horizontal axis represents a distance from a light incident part in which the light source 400 is disposed and a vertical axis represents output per unit area in watt per square millimeter (W/mm$^2$). In general, watt (W) is used to represent the output of lighting, and the intensity of illumination is proportional to the output (W) per unit area (mm$^2$).

Therefore, as the output becomes higher per unit area, the intensity of illumination becomes strong, and as the output becomes lower per unit area, the intensity of illumination becomes weak. That is, the brightness becomes high as the output becomes higher per unit area, and the brightness becomes low as the output becomes lower per unit area.

In graphs shown in FIG. 7, watt (W) per unit area (e g, mm$^2$) represents relative intensities of illumination. A black mold shown in FIG. 7 means the first frame member FR1 including the light absorbing material.

In an exemplary embodiment, the first reflective member FR1 extends to the light source 400 from the one side surface of the light guide plate 300 along the first direction D1 by the second distance L2 corresponding to the half of the first distance L1 and extends in the direction away from the light source 400 along the first direction D1 by the third distance L3 greater than the second distance L2.

Referring to FIG. 7, when the first frame member FR1 includes the light absorbing material, the intensity of illumination of the light traveling in the upward direction from the light incident part corresponds to about zero (0) W. That is, when the first frame member FR1 includes the black mold, the light is not provided to the upward direction from the light incident part. Although not shown in figures, a distance between an outer surface of the first frame member FR1 and the one side surface of the light guide plate 300 is set to be about 3.4 mm.

In the graphs shown in FIG. 7, uniformity is obtained by dividing a minimum value by a maximum value. When the uniformity is equal to or greater than about 70%, a difference in brightness of the light may not be perceived by an observer. That is, when a value obtained by dividing the minimum value by the maximum value is equal to or greater than about 0.7, the difference in brightness of the light may not be perceived by an observer. Since the intensity of illumination is proportional to the output (W), the uniformity may be referred to as a uniformity of the light.

Hereinafter, an area between the light incident part and a point spaced apart from the light incident part by about 30 mm to the light guide plate is referred to as an observation area.

When the uniformity of the observation area is equal to or greater than about 70% on the plane surface of the display device 600, the light traveling in the upward direction through the first frame member FR1 and the light traveling in the upward direction through the light guide plate 300 may not be distinct from each other in the observation area. That is, when the uniformity of the observation area is equal to or greater than about 70%, the light traveling in the upward direction through the first frame member FR1 and the light traveling in the upward direction through the light guide plate 300 are perceived by the observer as light having substantially uniform brightness in the observation area.

However, when the uniformity of the observation area is less than about 70%, the light traveling in the upward direction through the first frame member FR1 and the light traveling in the upward direction through the light guide plate 300 are perceived by the observer as light having different brightness in the observation area.

In one exemplary embodiment, for example, the maximum output and the minimum output of the diffusion members D_P having the density of about 750,000/mm$^3$ may be about 54,000 W and about 30,000 W, respectively. That is, the observation area has the maximum intensity of illumination corresponding to about 54,000 W and the minimum intensity of illumination corresponding to about 30,000 W by the diffusion members D_P having the density of about 750,000/mm$^3$. In this case, the uniformity of the observation area is about 56%, that is, the uniformity of the observation area may become about 56% by the diffusion members D_P having the density of about 750,000/mm$^3$.

Accordingly, due to the diffusion members D_P having the density of about 750,000/mm$^3$, the light traveling in the upward direction through the first frame member FR1 and the light traveling in the upward direction through the light guide plate 300 may be perceived by the observer as light having different brightness in the observation area.

In the observation area, the maximum output and the minimum output of the diffusion members D_P having the density of about 1,300,000/mm$^3$ may be about 42,000 W and about 30000 W, respectively. That is, the observation area has the maximum intensity of illumination corresponding to about 42,000 W and the minimum intensity of illumination corresponding to about 30,000 W by the diffusion members D_P having the density of about 1,300,000/mm$^3$. In this case, the uniformity of the observation area is about 70%, that is, the uniformity of the observation area may become about 70% by the diffusion members D_P having the density of about 1,300,000/mm$^3$.

Therefore, due to the diffusion members D_P having the density of about 1,300,000/mm$^3$, the light traveling in the upward direction through the first frame member FR1 and the light traveling in the upward direction through the light guide plate 300 may be perceived by the observer as light having substantially uniform brightness in the observation area.

The uniformity of the observation area according to the diffusion members D_P having the density of about 1,500,000/mm$^3$, about 1,700,000/mm$^3$, and about 2,000,000/mm$^3$ is set to be equal to or greater than about 70%. Thus, due to the diffusion members D_P having the density of about 1,500,000/mm$^3$, about 1,700,000/mm$^3$, and about 2,000,000/mm$^3$, the light traveling in the upward direction through the first frame member FR1 and the light traveling in the upward direction through the light guide plate 300 may be perceived by the observer as light having substantially uniform brightness in the observation area.

In the observation area, however the maximum output and the minimum output of the diffusion members D_P having the density of about 4,500,000/mm$^3$ may be about 33,000 W and about 19,000 W, respectively. That is, the observation area has the maximum intensity of illumination corresponding to about 33,000 W and the minimum intensity of illumination corresponding to about 19,000 W by the diffusion members D_P having the density of about 4,500,000/mm$^3$. In this case, the uniformity of the observation area is about 58%, that is, the uniformity of the observation area may become about 58% by the diffusion members D_P having the density of about 4,500,000/mm$^3$. In addition, the uniformity of the observation area according to the diffusion members D_P having the density of about 3,300,000/mm$^3$ and about 2,800,000/mm$^3$ may be less than about 70%.

Due to the diffusion members D_P having the density of about 450,000/mm$^3$, about 3,300,000/mm$^3$, and about 2,800,000/mm$^3$, the light traveling in the upward direction through the first frame member FR1 and the light traveling in the upward direction through the light guide plate 300 may be perceived by the observer as light having different brightness in the observation area.

According to the graphs shown in FIG. 7, when the diffusion members D_P have the density of about 1,300,000/mm$^3$ to about 2,000,000/mm$^3$, the light traveling in the upward direction through the first frame member FR1 and the light traveling in the upward direction through the light guide plate 300 may be perceived by the observer as light having substantially uniform brightness in the observation area. In addition, the light having the uniform brightness may travel in the upward direction in the entire area of the light guide plate 300. In an exemplary embodiment, the diffusion members D_P have the density of about 1,300,000/mm$^3$ to about 2,000,000/mm$^3$, such that the light traveling in the upward direction through the first frame member FR1 and the light traveling in the upward direction through the light guide plate 300 may be perceived by the observer as light having substantially uniform brightness.

Figure 8A:
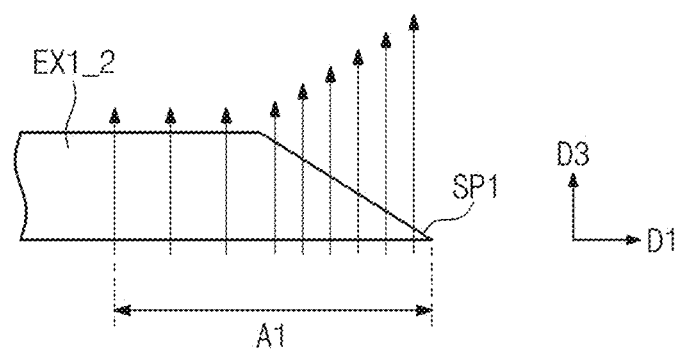
FIG. 8A is a view showing light upwardly passing through a first_second extension part and a first inclination part shown in FIG. 2.
Figure 8B:
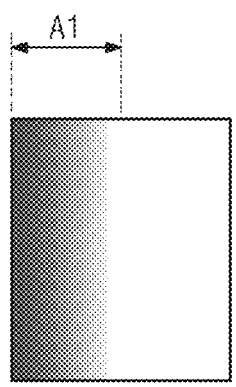
FIG. 8B is a view showing a first area of a display panel corresponding to the first_second extension part and the first inclination part shown in FIG. 8A.
Figure 9A:
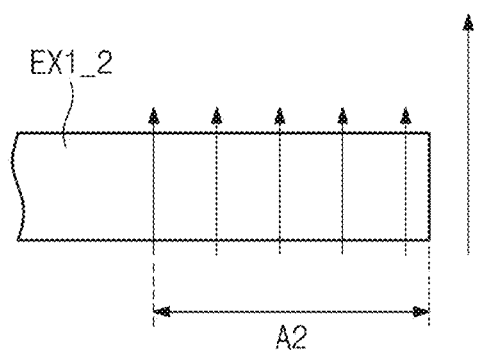
FIG. 9A is a view showing light upwardly passing through a first_second extension part when a first inclination part is not provided.
Figure 9B:
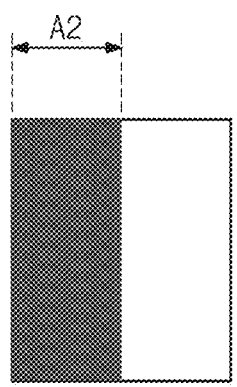
FIG. 9B is a view showing a second area of the display panel corresponding to the first_second extension part shown in FIG. 9A.

FIG. 8A is a view showing the light upwardly passing through the first_second extension part and the first inclination part shown in FIG. 2, FIG. 8B is a view showing a first area of the display panel corresponding to the first_second extension part and the first inclination part shown in FIG. 8A, FIG. 9A is a view showing a light upwardly passing through the first_second extension part when the first inclination part is not provided, and FIG. 9B is a view showing a second area of the display panel corresponding to the first_second extension part shown in FIG. 9A.

Referring to FIGS. 8A and 8B, the other side surface of the first inclination part SP1 is configured to include the inclination surface inclined downwardly with respect to the first direction D1 at the predetermined angle.

In an exemplary embodiment, the first frame member FR1 may not have the light transmittance of about 100%, that is, the first frame member FR1 may have the light transmittance less than about 100%. In such an embodiment, the light transmittance of the first frame member FR1 is substantially inversely proportional to the thickness of the first frame member FR1, that is, as the thickness of the first frame FR1 increases, the light transmittance decreases, and as the thickness of the first frame FR1 decreases, the light transmittance increases.

Accordingly, the transmittance of the light traveling in the upward direction and passing through the first inclination part SP1 is increased as it is closer to an end portion of the first inclination part SP1, which is farther away from the first_second extension part EX1_2. In FIGS. 8A and 9A, for the convenience of illustration, the transmittance of the light is indicated by the length of the arrow. As shown in FIG. 8A, in an exemplary embodiment, where the first_second extension part EX1_2 has a uniform thickness, the transmittance of the light passing through the first inclination part SP1 is gradually decreased as it is closer to the first_second extension part EX1_2 and is substantially uniformly maintained in the first_second extension part EX1_2.

In such an embodiment, as shown in FIG. 8B, the brightness of the light is gradually decreased as it is closer to the first_second extension part EX1_2 in the first area A1 of the display panel 100, and the brightness of the light is substantially uniformly maintained in the area of the display panel 100, which corresponds to the first_second extension part EX1_2.

Referring to FIGS. 9A and 9B, when the first inclination part SP1 is not provided in the first frame member FR1 and the first frame member FR1 has the light transmittance less than about 100%, the transmittance of the light is lowered by the first_second extension part EX1_2. In this case, as shown in FIG. 9B, the brightness of the light may be rapidly decreased in the second area A2 of the display panel 100, that is, the shape of the first_second extension part EX1_2 on the display panel 100 may be perceived by an observer.

In an exemplary embodiment, the brightness of the light is gradually decreased as it is closer to the first_second extension part EX1_2 by the first inclination part SP1. Thus, the brightness of the light may be effective prevented from being drastically decreased, such that the shape of the first_second extension part EX1_2 on the display panel 100 may not be perceived by the observer.

Figure 10:
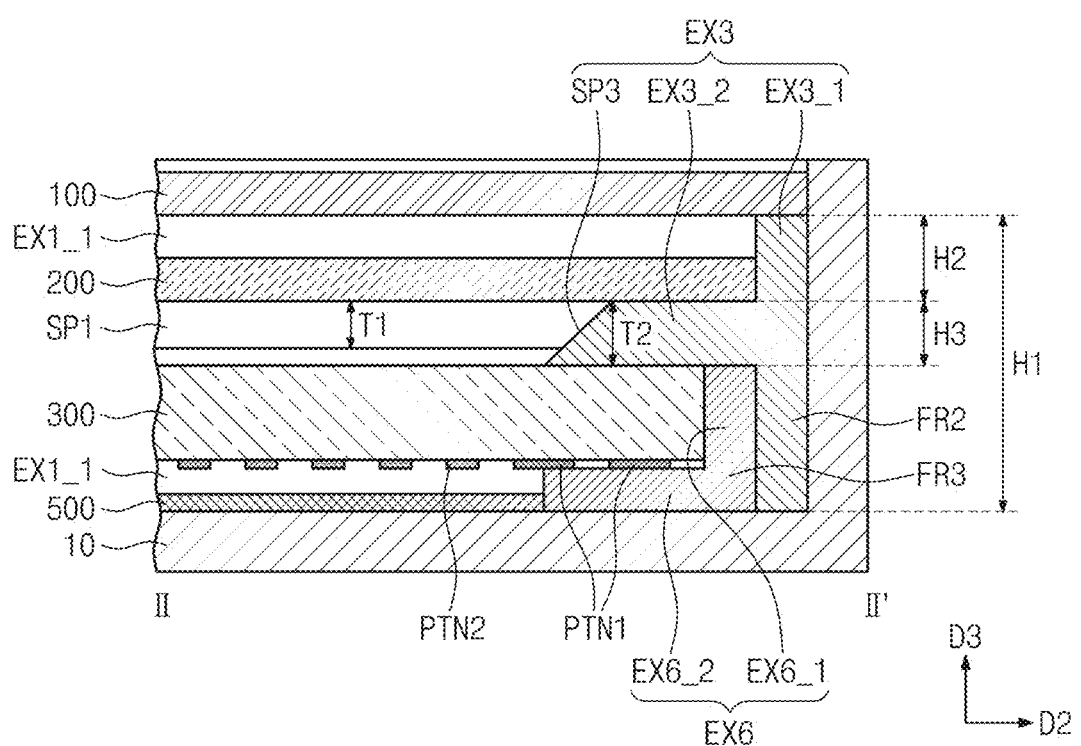
FIG. 10 is a cross-sectional view taken along line II-II' of the display device shown in FIG. 1, in which the frame members shown in FIG. 2 are accommodated in the protective member shown in FIG. 1.
Figure 11:
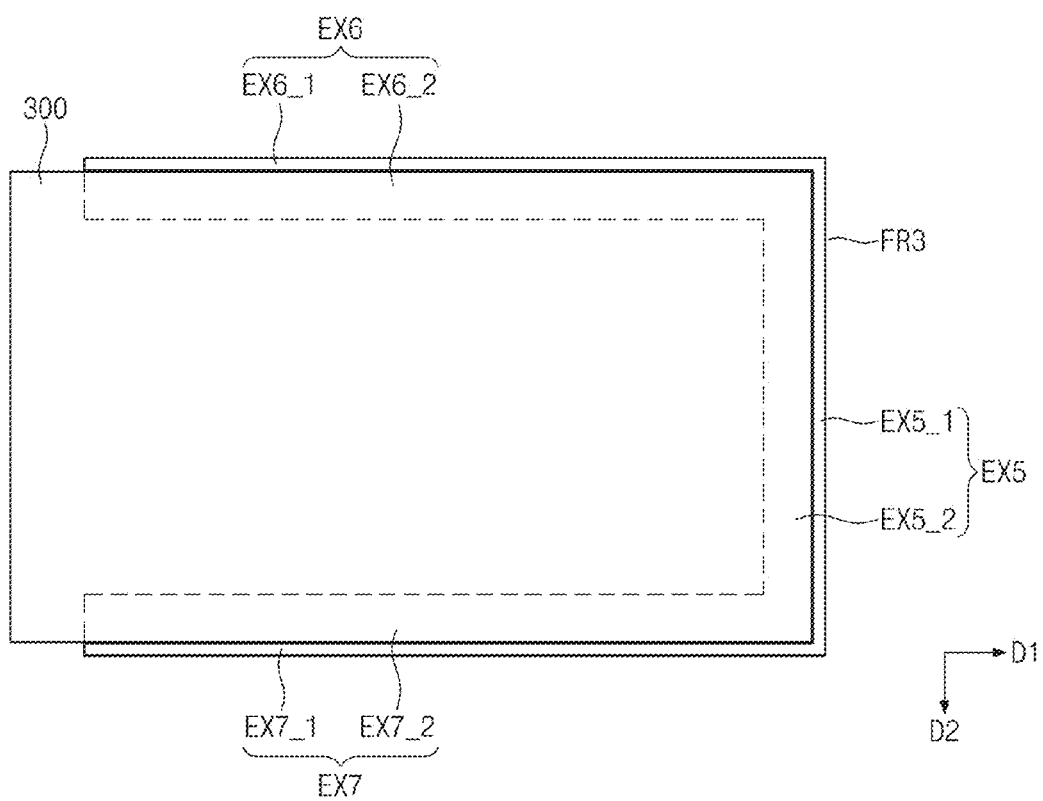
FIG. 11 is a top plan view showing an exemplary embodiment of a light guide plate shown in FIG. 1, which is disposed on a third frame member shown in FIG. 2.
Figure 12:
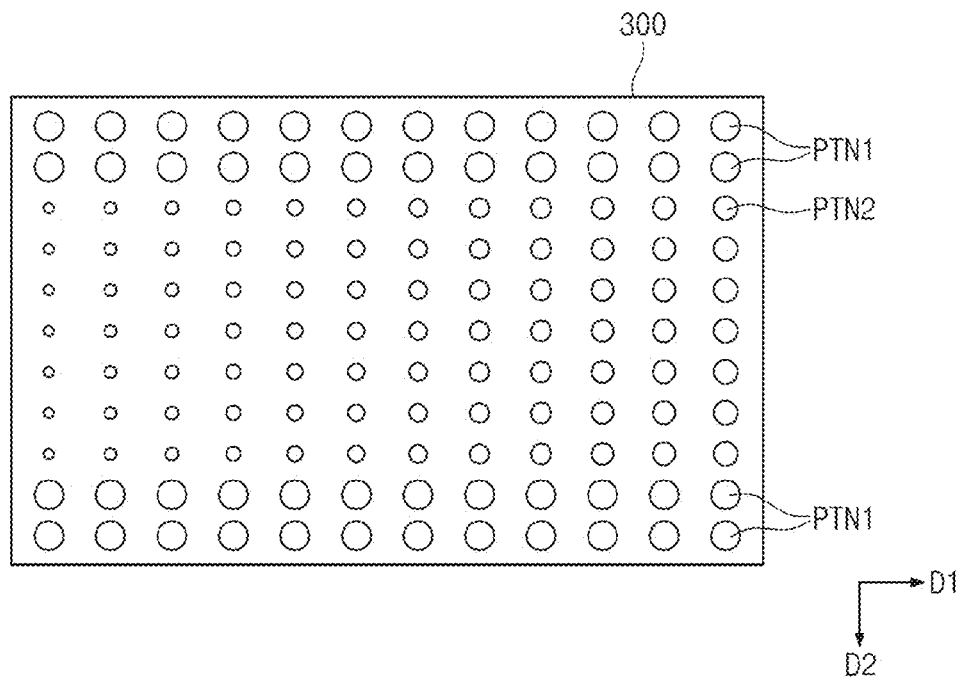
FIGS. 12 and 13 are views showing exemplary embodiments of a scattering pattern disposed on a lower portion of the light guide plate shown in FIG. 1.
Figure 13:
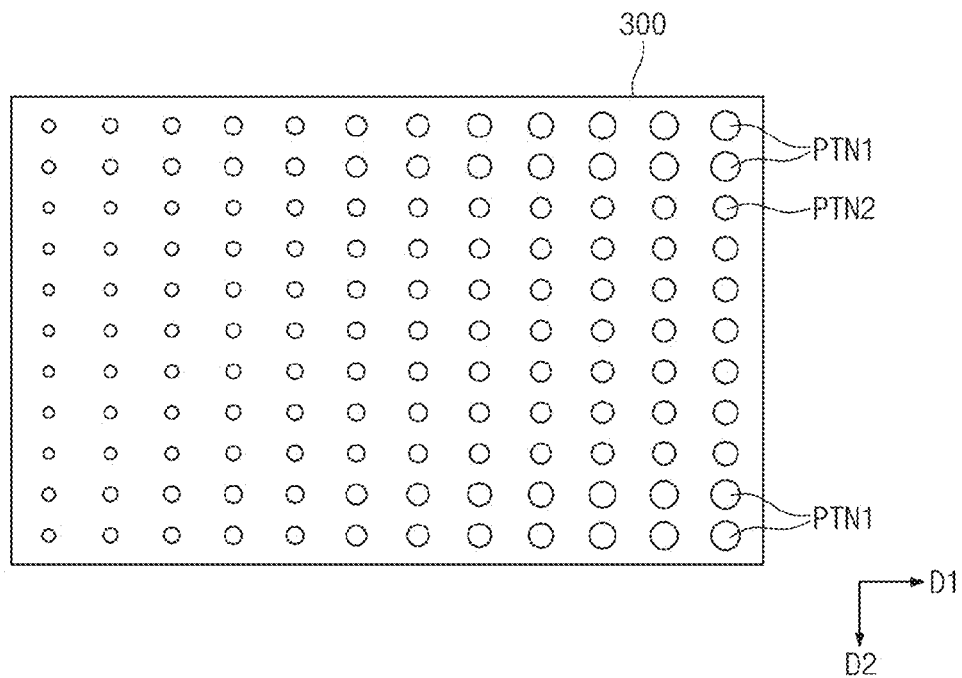

FIG. 10 is a cross-sectional view taken along line II-II' of the display device shown in FIG. 1, in which the frame members shown in FIG. 2 are accommodated in the protective member shown in FIG. 1, FIG. 11 is a top plan view showing an exemplary embodiment of the light guide plate shown in FIG. 1, which is disposed on the third frame member shown in FIG. 2, and FIGS. 12 and 13 are views showing exemplary embodiments of scattering patterns disposed on the lower portion of the light guide plate shown in FIG. 1.

Referring to FIGS. 10, 11 and 12, the display panel 100, the optical sheet 200, the light guide plate 300, the light source 400, the reflective plate 500 and the second and third frame members FR2 and FR3 are accommodated in the protective member 10.

The outer surface of the third_first extension EX3_1 of the third extension part EX3 is disposed on the inner surface of the one side portion of the protective member 10 in the second direction D2. Although not shown in figures, the outer surface of the second_first extension part EX2_1 of the second extension part EX2 may be in contact with the inner surface of the one side portion of the protective member 10 in the first direction D1, and the outer surface of the fourth_first extension part EX4_1 of the fourth extension part EX4 is disposed on the inner surface of the other side portion of the protective member 10 in the second direction D2. Herein, a side portion in the first or second direction D1 or D2 means a portion at a side facing the first or second direction D1 or D2.

The upper surface and the outer surface of the sixth_first extension part EX6_1 are disposed on the lower surface of the third_second extension part EX3_2 and the inner surface of the third_first extension part EX3_1 under the third_second extension part EX3_2, respectively. Although not shown in figures, the arrangements of the fourth extension part EX4 and the seventh extension part EX7 are substantially the same as the arrangements of the third extension part EX3 and the sixth extension part EX6. In one exemplary embodiment, for example, the upper surface and the outer surface of the seventh_first extension part EX7_1 are disposed on the lower surface of the fourth_second extension part EX4_2 and the inner surface of the fourth_first extension part EX4_1 under the fourth_second extension part EX4_2, respectively.

The third_first extension part EX3_1 has the first height H1 in the third direction D3. The third_second extension part EX3_2 is spaced apart downwardly from the upper portion of the third_first extension part EX3_1 in the third direction D3 by the second height H2 and connected to the inner surface of the third_first extension part EX3_1.

Although not shown in figures, the second_first extension part EX2_1 and the fourth_first extension part EX4_1 have the first height H1. In such an embodiment, the second_second extension part EX2_2 is spaced apart downwardly from the upper portion of the second_first extension part EX2_1 by the second height H2 and connected to the inner surface of the second_first extension part EX2_1. The fourth_second extension part EX4_2 is spaced apart downwardly from the upper portion of the fourth_first extension part EX4_1 by the second height H2 and connected to the inner surface of the fourth_first extension part EX4_1.

A distance between the upper surface of the third_second extension part EX3_2 and the upper surface of the light guide plate 300 is referred to as the third height H3. The third_second extension part EX3_2 has a second thickness T2 in the third direction D3. The second thickness T2 is substantially equal to the third height H3 and greater than the first thickness T1. Although not shown in figures, each of the second_second extension part EX2_2 and the fourth_second extension part EX4_2 has the second thickness T2.

As shown in FIG. 11, the light guide plate 300 is disposed on the third frame member FR3. The predetermined area of the other side portion of the light guide plate 300 in the first direction D1 is disposed on the fifth extension part EX5, and the predetermined areas of the both side portions of the light guide plate 300 in the second direction D2 are disposed on the sixth extension part EX6 and the seventh extension part EX7, respectively.

In such an embodiment, as shown in FIG. 10, the predetermined area of the one side portion of the light guide plate 300 in the second direction D2 is disposed on the sixth_second extension part EX6_2. Although not shown in figures, the configuration of the light guide plate 300 disposed on the fifth extension part EX5 and the seventh extension part EX7 is substantially the same as the configuration of the light guide plate 300 disposed on the sixth extension part EX6. In one exemplary embodiment, for example, the predetermined area of the other side portion of the light guide plate 300 in the second direction D2 is disposed on the seventh_second extension part EX7_2. Although not shown in figures, the predetermined area of the other side portion of the light guide plate 300 in the first direction D1 is disposed on the fifth_second extension part EX5_2.

The light guide plate 300 is held by the second frame member FR2. In such an embodiment, the light guide plate 300 is maintained in a predetermined position collectively by the second and third frame members FR2 and FR3. The predetermined area of the other side portion of the light guide plate 300 in the first direction D1 is held by the second extension part EX2, and the predetermined areas of the both side portions of the light guide plate 300 in the second direction D2 are held by the third extension part EX3 and the fourth extension part EX4, respectively.

In such an embodiment, as shown in FIG. 10, the third_second extension part EX3_2 is disposed on the predetermined area of the one side portion of the light guide plate 300 in the second direction D2. Although not shown in figures, the configuration of the light guide plate 300 held by the second extension part EX2 and the fourth extension part EX4 is substantially the same as the configuration of the light guide plate 300 held by the third extension part EX3. In one exemplary embodiment, for example, the second_second extension part EX2_2 is disposed on the predetermined area of the other side portion of the light guide plate 300 in the first direction D1, and the fourth_second extension part EX4_2 is disposed on the predetermined area of the other side portion of the light guide plate 300 in the second direction D2.

The optical sheet 200 is disposed on the first frame member FR1 and the second frame member FR2. Predetermined areas of both side portions of the optical sheet 200 in the first direction D1 are disposed on the first extension part EX1 and the second extension part EX2, respectively, and predetermined areas of both side portions of the optical sheet 200 in the second direction D2 are disposed on the third extension part EX3 and the fourth extension part EX4, respectively.

In such an embodiment, as described with reference to FIG. 5, the predetermined area of the one side portion of the optical sheet 200 in the first direction D1 is disposed on the first_second extension part EX1_2. In such an embodiment, as shown in FIG. 10, the predetermined area of the one side portion of the optical sheet 200 in the second direction D2 is disposed on the third_second extension part EX3_2.

Although not shown in figures, the configuration of the optical sheet 200 disposed on the second extension part EX2 and the fourth extension part EX4 is substantially the same as the configuration of the optical sheet 200 disposed on the third extension part EX3. In one exemplary embodiment, for example, the predetermined area of the other side portion of the optical sheet 200 in the first direction D1 is disposed on the second_second extension part EX2_2, and the predetermined area of the other side portion of the optical sheet 200 in the second direction D2 is disposed on the fourth_second extension part EX4_2.

The predetermined areas of the both side portions of the display panel 100 in the first direction D1 are disposed on the first extension part EX1 and the second extension part EX2, respectively, and the predetermined areas of the both side portions of the display panel 100 in the second direction D2 are disposed on the third extension part EX3 and the fourth extension part EX4.

In an exemplary embodiment, as described with reference to FIG. 5, the predetermined area of the one side portion of the display panel 100 in the first direction D1 is disposed on the first_first extension part EX1_1. In such an embodiment, as shown in FIG. 10, the predetermined area of the one side portion of the display panel 100 in the second direction D2 is disposed on the third_first extension part EX3_1. Although not shown in figures, the predetermined area of the other side portion of the display panel 100 in the first direction D1 is disposed on the second_first extension part EX2_1 and the predetermined area of the other side portion of the display panel 100 in the second direction D2 is disposed on the fourth_first extension part EX4_1.

As described above, the scattering patterns PTN are disposed on the lower surface of the light guide plate 300. The scattering patterns PTN may be arranged substantially in a matrix form including rows and columns.

As shown in FIGS. 11 and 12, the scattering patterns PTN are configured to include first scattering patterns PTN1 arranged at both side portions of the lower surface of the light guide plate 300 in the second direction D2 and second scattering patterns PTN2 arranged between the both side portions of the lower surface of the light guide plate 300. The first and second scattering patterns PTN1 and PTN2 may have a substantially circular shape.

The first scattering patterns PTN1 are arranged in a plurality of rows (e.g., a few rows) along the first direction D1 at the both side portions of the light guide plate 300 in the second direction D2. In one exemplary embodiment, for example, the first scattering patterns PTN1 are arranged in two rows along the first direction D1 at the both side portions of the light guide plate 300 in the second direction D2.

In an exemplary embodiment, the second scattering patterns PTN2 have a size that gradually becomes larger as it moves along the first direction D1. As the size of the second scattering patterns PTN2 becomes larger, an amount of the light provided to the second scattering patterns PTN2 is increased, and the increased amount of the light provided to the second scattering patterns PTN2 is scattered by the second scattering patterns PTN2. Therefore, although the scattering patterns PTN are farther away from the light incident part along the first direction D1, the brightness of the light guide plate 300 may be effectively prevented from being lowered, thereby effectively maintaining the uniformity of the light in the light guide plate.

In an exemplary embodiment, as shown in FIG. 12, the first scattering patterns PTN1 may have a size greater than the largest second scattering pattern of the second scattering patterns PTN2.

In an exemplary embodiment, as shown in FIG. 13, the first scattering patterns PTN1 may have a size that gradually becomes larger along the first direction D1. In such an embodiment, the first scattering patterns PTN1 arranged in the same columns as the second scattering patterns PTN2 in the second direction D2 may have the size greater than a size of the second scattering patterns PTN2 arranged in the same columns as the first scattering patterns PTN1.

In an exemplary embodiment, the structure of the second, third and fourth inclination parts SP2, SP3 and SP4 of the second frame member FR2 is substantially the same as the structure of the first inclination part SP1. In such an embodiment, the second, third and fourth inclination parts SP2 SP3, and SP4 gradually reduce the brightness of the light passing therethrough. Accordingly, the brightness of the light may be effectively prevented from rapidly reduced by the second, third and fourth inclination parts SP2, SP3 and SP4, and thus the shapes of the second_second extension part EX2_2, the third_second extension part EX32 and the fourth_second extension part EX4_2 on the display panel 100 may be effectively prevented from being perceived by the observer.

Figure 14:
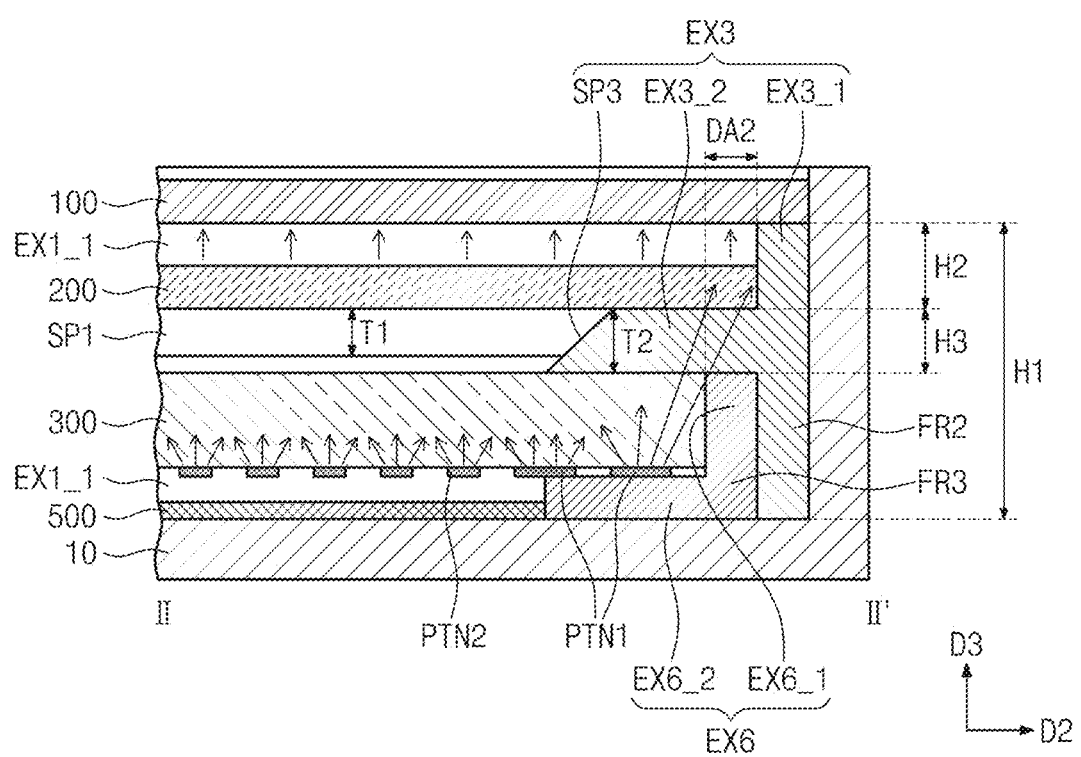
FIG. 14 is a cross-sectional view showing an optical path of the light in the display device shown in FIG. 10.

FIG. 14 is a cross-sectional view showing an optical path of the light when viewed in the display device shown in FIG. 10.

Referring to FIG. 14, the second scattering patterns PTN2 have the size that gradually becomes larger along the first direction D1, and thus the light having substantially uniform brightness travels in the upward direction.

The area of the display panel 100, which is overlaps the sixth_first extension part EX6_1 of the sixth extension part EX6, is referred to as a second display area DA2. As shown in figures, the second display area DA2 does not overlap the light guide plate 300.

If the second scattering patterns PTN2 is arranged in the area, in which the first scattering patterns PTN1 are arranged in an exemplary embodiment, instead of the first scattering patterns PTN1 and the third frame member FR3 may include the black mold, that is, the light scattered by the second scattering patterns PTN2 having the size smaller than the size of the first scattering patterns PTN1 is not provided to the second area DA2, the second display area DA2 may be perceived as a black color by the third frame member FR3. Thus, the second display area DA2 of the display panel 100 is inactivated, such that the image may not be displayed in the second display area DA2.

In an exemplary embodiment of the invention, the first scattering patterns PTN1 disposed at both side portions of the lower surface of the light guide plate 300 in the second direction D2 have the size greater than the size of the second scattering patterns PTN2. Accordingly, the first scattering patterns PTN1 may receive and scatter the light in amount greater than the light provided to the second scattering patterns PTN2. In such an embodiment, the third frame member FR3 includes the light transmitting material, such that the second display area DA2 of the display panel 100 is not perceived as the black color, and the light is thereby provided to the second display area DA2.

Although not shown in figures, the light may be provided to the second display area DA2 of the display panel 100, which overlaps the seventh_first extension part EX7_1 of the seventh extension part EX7, by the second scattering patterns PTN2.

Thus, in such an embodiment, the image may be displayed in the second display area DA2 of the display panel 100, such that the display area of the display panel 100, in which the image is displayed, may be expanded.

Accordingly, in an exemplary embodiment of the invention, the display device 600 including the backlight unit BLU may have an extended display area.

Figure 15:
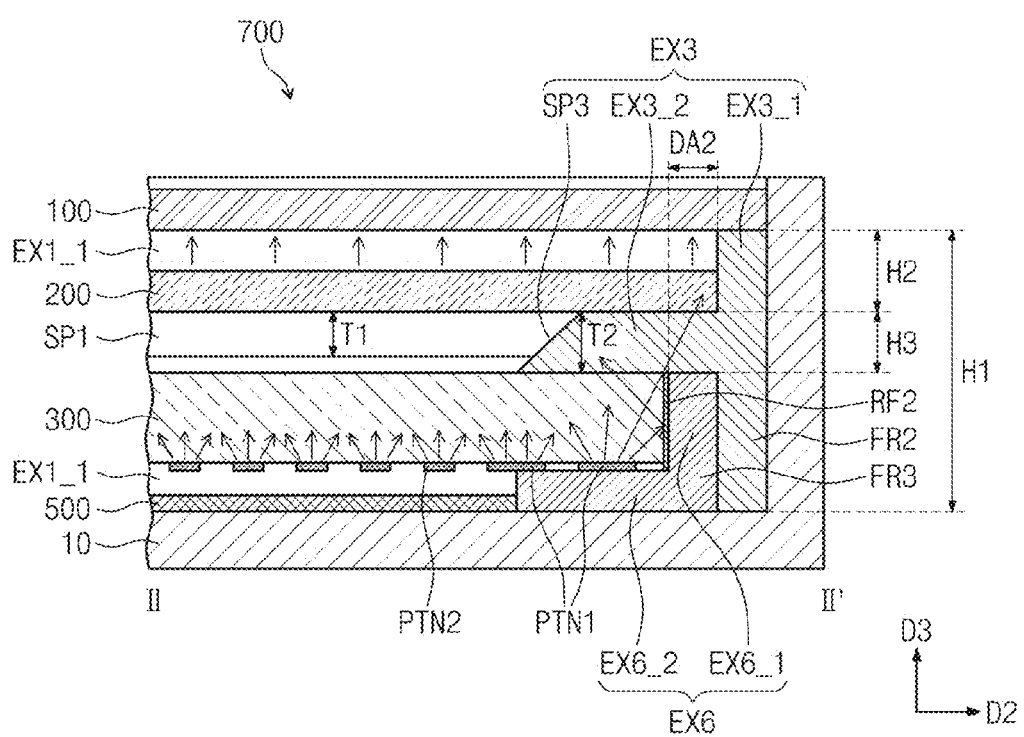
FIGS. 15 and 16 are cross-sectional views showing a third frame member of alternative exemplary embodiments of the display device, according to the invention.
Figure 16:
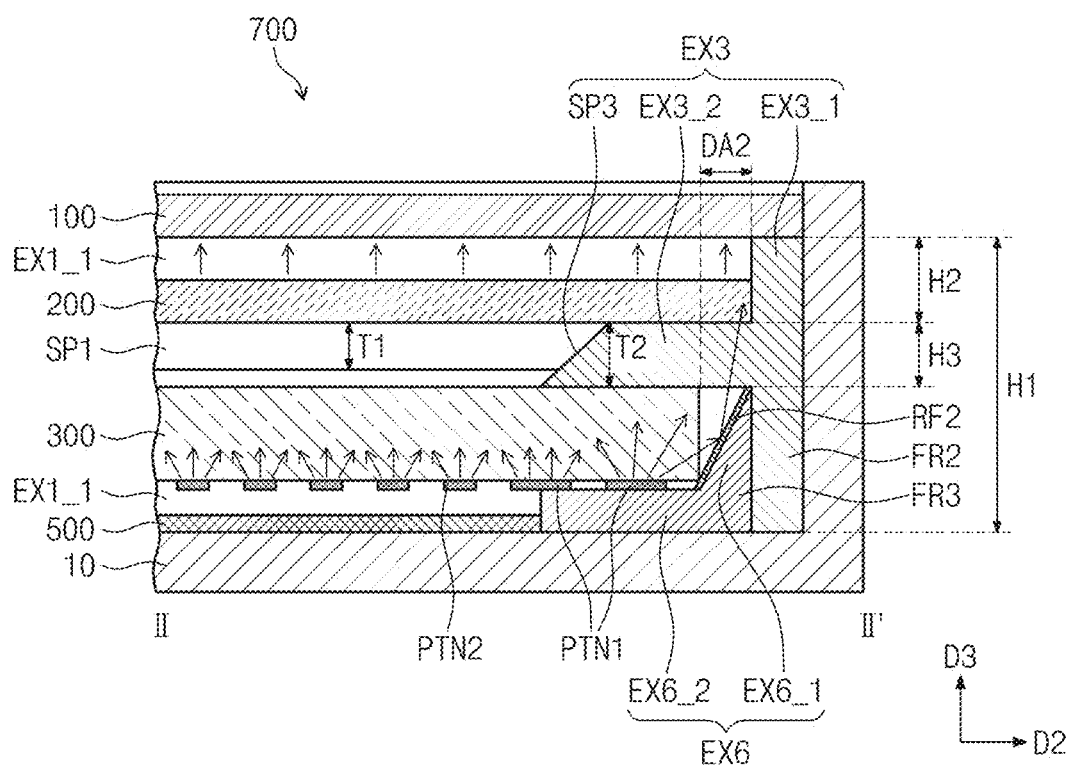

FIGS. 15 and 16 are cross-sectional views showing a third frame member of alternative exemplary embodiments of a display device according to the invention.

For the convenience of description, FIGS. 15 and 16 show the optical path of the light when viewed in a cross-sectional view taken along line II-II' shown in FIG. 1. The display device shown in FIGS. 15 and 16 has substantially the same structure and function as the display device shown in FIGS. 1 and 2 except for the third frame member FR3. Therefore, only the third frame member FR3 will be described in detail.

In an exemplary embodiment, a sixth extension part EX6 and a seventh extension part EX7 of the third frame member FR3 of the display device 700 have the same structure and function, and thus only the sixth extension part EX6 have been shown in FIG. 15 for convenience of illustration.

Referring to FIG. 15, a fifth_second extension part EX5_2, a sixth_second extension part EX6_2 and a seventh_second extension part EX7_2 are vertically disposed on an inner surface of a fifth_first extension part EX5_1, an inner surface of a sixth_first extension part EX6_1 and an inner surface of a seventh extension part EX7_1, respectively.

In an exemplary embodiment, the third frame member FR3 includes a second reflective member RF2 disposed on the inner surface of the sixth_first extension part EX6_1 of the sixth extension part EX6 disposed adjacent to the first scattering patterns PTN1. Although not shown in figures, the second reflective member RF2 is disposed on the inner surface of the seventh_first extension part EX7_1 of the seventh extension part EX7 disposed adjacent to the first scattering patterns PTN1.

When the second reflective member RF2 is not provided, the light scattered by the first scattering patterns PTN1 transmits through the third frame member FR3 including the light transmitting material and travels to the outside of the third frame member FR3, such that a light loss may occur.

In an exemplary embodiment, where the third frame member FR3 includes the second reflective member RF2, the second reflective member RF2 disposed at the inner surface of the sixth_first extension part EX6_1 and the seventh_first extension part EX7_1 reflects the light traveling toward the third frame member FR3 such that the reflected light is provided to the light guide plate 300 again. Thus, in such an embodiment, the light loss may be effectively prevented.

Referring to FIG. 16, in an alternative exemplary embodiment, the inner surface of the sixth_first extension part EX6_1, which does not overlap the sixth_second extension part EX6_2, may include an inclination surface inclined outward from the sixth_first extension part EX6_1 with respect to the upward direction. In such an embodiment, the inclination surface of the sixth_first extension part EX6_1 is inclined at an angle in a range of about 30 degrees to about 60 degrees with respect to the upward direction. The second reflective member RF2 may be disposed on the inclination surface of the sixth_first extension part EX61.

Although not shown in figures, the inner surface of the seventh_first extension part EX7_1, which does not overlap the seventh_second extension part EX7_2, may include an inclination surface inclined outward from the seventh_first extension part EX7_1 with respect to the upward direction. In such an embodiment, the inclination surface of the seventh_first extension part EX7_1 is inclined at an angle in a range of about 30 degrees to about 60 degrees with respect to the upward direction. The second reflective member RF2 may be disposed on the inclination surface of the seventh_first extension part EX7_1.

The outer surface of the sixth_first extension part EX6_1 is disposed on the third_first extension part EX3_1 under the third_second extension part EX3_2. The inclination surface of the sixth_first extension part EX6_1 is disposed under the third_second extension part EX3_2.

Although not shown in figures, the outer surface of the seventh_first extension part EX7_1 is disposed on the fourth_first extension part EX4_1 under the fourth_second extension part EX4_2. The inclination surface of the seventh_first extension part EX7_1 is disposed under the fourth_second extension part EX4_2.

The second reflective member RF2 disposed on the inner surface of the sixth_first extension part EX6_1 and the seventh_first extension part EX7_1 reflects the light traveling toward the third frame member FR3, and the reflected light is provided to the second display area DA2 of the display panel 100. Therefore, the light loss may be effectively prevented and the reflected light may be provided to the second display area DA2 of the display panel 100.

The display device 700 shown in FIGS. 15 and 16 have the same structure and function as those of the display device 600 shown in FIGS. 1 and 2 except for the third frame member FR3.

Accordingly, in such an embodiment, the display device 700 including the backlight unit BLU has an expanded display area, as described above.

The invention should not be construed as being limited to the exemplary embodiments set forth herein. Rather, these exemplary embodiments are provided so that this disclosure will be thorough and complete and will fully convey the concept of the present invention to those skilled in the art.

While the invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A backlight unit comprising:
   a light source which generates light;
   a light guide plate which guides the light from the light source substantially in an upward direction;
   a first frame member which holds the light source and diffuses the light traveling substantially in the upward direction between the light source and the light guide plate;
   a second frame member which holds the light guide plate;
   a third frame member which holds the light guide plate;
   a reflective plate disposed under the light guide plate, wherein the reflective plate reflects the light leaked downwardly from the light guide plate to the upward direction; and
   an optical sheet disposed on the light guide plate and the first to third frame members, wherein the optical sheet diffuses the light provided from the first frame member and the light guide plate and condenses the light substantially in the upward direction.

2. The backlight unit of claim 1, wherein
   the first frame member comprises a first extension part which holds the light source,
   a predetermined area of one side portion of the light guide plate in a first direction overlaps the first extension part, and
   the first extension part extends substantially in a second direction, which is substantially vertical to the first direction.

3. The backlight unit of claim 2, wherein the first extension part comprises:
   a first_first extension part having a long side in the second direction, a short side in a third direction, which is substantially vertical to the first and second directions, and a first height in the third direction;
   a first_second extension part connected to an inner surface of the first_first extension part and having a long side in the second direction and a short side in the first direction;
   a first inclination part connected to the first_second extension part; and
   a first reflective member disposed on a lower surface of the first_second extension part,
   wherein one side surface of the first_second extension part in the first direction is spaced apart downwardly from an upper portion of the first_first extension part by a second height, which is less than the first height and connected to the inner surface of the first_first extension part,
   the other side surface of the first_second extension part in the first direction is connected to one side surface of the first inclination part, and
   the other side surface of the first inclination part is inclined downwardly at a predetermined angle with respect to the first direction.

4. The backlight unit of claim 3, wherein
   the light source is connected to the inner surface of the first_first extension part under the first_second extension part, and
   a predetermined area of the first_second extension part and the first inclination part are disposed to overlap the predetermined area of the one side portion of the light guide plate in the first direction.

5. The backlight unit of claim 3, wherein the first_second extension part comprises:
   a resin mold member; and
   a plurality of diffusion members accommodated in the resin mold member and having a refractive index different from a refractive index of the resin mold member.

6. The backlight unit of claim 5, wherein
   the resin mold member comprises polycarbonate, and
   the diffusion members comprise silicon particles.

7. The backlight unit of claim 5, wherein
   a density of the diffusion members is in a range of about 1,300,000 particles per cubic millimeter to about 2,000,000 particles per cubic millimeter.

8. The backlight unit of claim 3, wherein
   the light source is spaced apart from one side surface of the light guide plate in the first direction by a first distance, and
   the first reflective member extends from the one side surface of the light guide plate toward the light source by a second distance corresponding to a half of the first distance and extends from the one side surface of the light guide plate in a direction, which is farther away from the light source, by a third distance, which is greater than the second distance.

9. The backlight unit of claim 3, wherein the first reflective member comprises a titanium dioxide.

10. The backlight unit of claim 3, wherein
    a light uniformity in an area between a light incident part, in which the light source is disposed, and a point spaced apart from the light incident part by about 30 millimeters is equal to or greater than about 70%, and
    the light uniformity is obtained by dividing a maximum intensity of illumination by a minimum intensity of illumination.

11. The backlight unit of claim 3, wherein
    the third frame member is disposed under the second frame member to overlap the second frame member, and a predetermined area of the other side portion of the light guide plate in the first direction and predetermined areas of both side portions of the light guide plate in the second direction are disposed and held between the second frame member and the third frame member.

12. The backlight unit of claim 11, wherein
the second frame member comprises:
   a second extension part which extends in the second direction and is disposed to face the first extension part; and
   third and fourth extension parts which are connected to both ends of the second extension part, extend in the first direction to be disposed adjacent to both ends of the first extension part, and are disposed to face each other,
the third frame member comprises:
   a fifth extension part which extends in the second direction; and
   sixth and seventh extension parts which are connected to both ends of the fifth extension part, extend in the first direction to be disposed adjacent to both ends of the first extension part, and are disposed to face each other,
   wherein
   the fifth extension part is disposed under the second extension part to overlap the second extension part,
   the sixth extension part is disposed under the third extension part to overlap the third extension part, and
   the seventh extension part is disposed under the fourth extension part to overlap the fourth extension part.

13. The backlight unit of claim 12, wherein
the second extension part comprises:
   a second_first extension part disposed to face the first_first extension part and having the first height in the third direction, a long side in the second direction and a short side in the third direction;
   a second_second extension part connected to an inner surface of the second_first extension part, and having a long side in the second direction and a short side in the first direction; and
   a second inclination part connected to the second_second extension part,
the third extension part comprises:
   a third_first extension part having the first height in the third direction, a long side in the first direction and a short side in the third direction;
   a third_second extension part connected to an inner surface of the third_first extension part, and having a long side in the first direction and a short side in the second direction; and
   a third inclination part connected to the third_second extension part, and
the fourth extension part comprises:
   a fourth_first extension part having the first height in the third direction, a long side in the first direction and a short side in the third direction;
   a fourth_second extension part connected to an inner surface of the fourth_first extension part, and having a long side in the first direction and a short side in the second direction; and
   a fourth inclination part connected to the fourth_second extension part.

14. The backlight unit of claim 13, wherein
one side surface of the second_second extension part in the first direction is spaced apart downwardly from an upper portion of the second_first extension part by the second height and connected to the inner surface of the second_first extension part,
the other side surface of the second_second extension part in the first direction is connected to one side surface of the second inclination part,
the other side surface of the second inclination part in the first direction is inclined downwardly by a predetermined angle with respect to the first direction,
one side surface of the third_second extension part in the second direction is spaced apart downwardly from an upper portion of the third_first extension part by the second height and connected to the inner surface of the third_first extension part,
the other side surface of the third_second extension part in the second direction is connected to one side surface of the third inclination part,
the other side surface of the third inclination part is inclined downwardly by a predetermined angle with respect to the second direction,
one side surface of the fourth_second extension part in the second direction is spaced apart downwardly from an upper portion of the fourth_first extension part by the second height and connected to the inner surface of the fourth_first extension part,
the other side surface of the fourth_second extension part in the second direction is connected to one side surface of the fourth inclination part, and
the other side surface of the fourth inclination part is inclined downwardly by a predetermined angle with respect to the second direction.

15. The backlight unit of claim 13, wherein
the fifth extension part comprises:
   a fifth_first extension part having a long side in the second direction and a short side in the third direction; and
   a fifth_second extension part connected to a lower portion of an inner surface of the fifth_first extension part, and having a long side in the second direction and a short side in the first direction,
the sixth extension part comprises:
   a sixth_first extension part having a long side in the first direction and a short side in the third direction; and
   a sixth_second extension part connected to a lower portion of an inner surface of the sixth_first extension part, and having a long side in the first direction and a short side in the second direction, and
the seventh extension part comprises:
   a seventh_first extension part having a long side in the first direction and a short side in the third direction; and
   a seventh_second extension part connected to a lower portion of an inner surface of the seventh_first extension part, and having a long side in the first direction and a short side in the second direction.

16. The backlight unit of claim 15, further comprising:
a second reflective member disposed on each of the inner surface of the sixth_first extension part and the inner surface of the seventh_first extension part,
wherein the fifth_second extension part, the sixth_second extension part and the seventh_second extension part are substantially vertically disposed on the fifth_first extension part, the sixth_first extension part and the seventh_first extension part, respectively.

17. The backlight unit of claim 15, further comprising:
a second reflective member disposed on an inclination surface of the sixth_first extension part and an inclination surface of the seventh_first extension part,
wherein
the inner surface of the sixth_first extension part, which does not overlap the sixth_second extension part, comprises the inclination surface inclined outwardly from the sixth_first extension part at a predetermined angle with respect to the upward direction,
the inner surface of the seventh_first extension part, which does not overlap the seventh_second extension part, comprises the inclination surface inclined outward from the seventh_first extension part at a predetermined angle with respect to the upward direction, and
the inclination surface of the sixth_second extension part and the inclination surface of the seventh_second extension part are inclined at the predetermined angle in a range of about 30 degrees to about 60 degrees with respect to the upward direction.

18. The backlight unit of claim 15, wherein
an upper surface and an outer surface of the fifth_first extension part are respectively disposed on a lower surface of the second_second extension part and the inner surface of the second_first extension part under the second_second extension part,
an upper surface and an outer surface of the sixth_first extension part are respectively disposed on a lower surface of the third_second extension part and the inner surface of the third_first extension part under the third_second extension part, and
an upper surface and an outer surface of the seventh_first extension part are respectively disposed on a lower surface of the fourth_second extension part and the inner surface of the fourth_first extension part under the fourth_second extension part.

19. The backlight unit of claim 15, wherein
the predetermined area of the other side portion of the light guide plate in the first direction is disposed on the fifth_second extension part,
the second_second extension part is disposed on the predetermined area of the other side portion of the light guide plate in the first direction,
the predetermined areas of the both side portions of the light guide plate in the second direction are respectively disposed on the sixth_second extension part and the seventh_second extension part, and
the third_second extension part and the fourth_second extension part are respectively disposed on the predetermined areas of the both side portions of the light guide plate in the second direction.

20. The backlight unit of claim 15, wherein
predetermined areas of both side portions of the optical sheet in the first direction are respectively disposed on the first_second extension part and the second_second extension part, and
the predetermined areas of the both side portions of the optical sheet in the second direction are respectively disposed on the third_second extension part and the fourth_second extension part.

21. The backlight unit of claim 1, further comprising:
a plurality of scattering patterns disposed on a lower surface of the light guide plate and arranged substantially in a matrix form, wherein the scattering patterns reflect and diffuse the light incident thereto.

22. The backlight unit of claim 21, wherein the scattering patterns comprise:
a plurality of first scattering patterns arranged in both side portions of the light guide plate in a second direction, which substantially vertical to a first direction; and
a plurality of second scattering patterns arranged between the both side portions of the light guide plate in the second direction,
wherein the second scattering patterns have a size which gradually becomes larger along the first direction.

23. The backlight unit of claim 22, wherein
the first scattering patterns have a size larger than the largest size of the second scattering patterns.

24. The backlight unit of claim 22, wherein
the first scattering patterns have a size which gradually becomes larger along the first direction, and
the first scattering patterns arranged in a same column as the second scattering patterns in the second direction have the size greater than the size of the second scattering patterns arranged in the same column.

25. The backlight unit of claim 1, wherein each of the first, second and third frame members comprises polycarbonate.

26. A display device comprising:
a display panel which controls a transmittance of light provided thereto to display an image; and
a backlight unit disposed under the display panel, wherein the backlight unit provides the light to the display panel, and the backlight unit comprises:
a light source which generates the light;
a light guide plate which guides the light from the light source substantially to an upward direction;
a first frame member which holds the light source and diffuses the light traveling substantially in the upward direction between the light source and the light guide plate;
a second frame member which holds the light guide plate;
a third frame member which holds the light guide plate;
a reflective plate disposed under the light guide plate, wherein the reflective plate reflects the light leaked downwardly from the light guide plate substantially to the upward direction; and
an optical sheet disposed on the light guide plate and the first to third frame members, wherein the optical sheet diffuses the light provided from the first frame member and the light guide plate and condenses the light substantially in the upward direction.

27. The display device of claim 26, wherein
the first frame member comprises a first extension part which holds the light source, wherein the first extension part comprises:
a first_first extension part having a long side in a second direction, which is substantially vertical to a first direction, a short side in a third direction, which is vertical to the first and second directions, and a first height in the third direction;
a first_second extension part spaced apart downwardly from an upper portion of the first_first extension part by a second height, which is less than the first height, connected to an inner surface of the first_first extension part, and having a long side in the second direction and a short side in the first direction;
a first inclination part connected to the first_second extension part and having a predetermined inclination surface in the first direction; and
a first reflective member disposed on a lower surface of the first_second extension part.

28. The display device of claim 27, wherein the first_second extension part comprises:
a resin mold member; and
a plurality of diffusion members accommodated in the resin mold member and having a refractive index different from a refractive index of the resin mold member, wherein
the diffusion members comprise a plurality of particles,
a density of the diffusion members is in a range of about 1,300,000 particles per cubic millimeter to about 2,000,000 particles per cubic millimeter,
the light source is spaced apart from one side surface of the light guide plate in the first direction by a first distance, and
the first reflective member extends from the one side surface of the light guide plate toward the light source by a second distance corresponding to a half of the first distance and extends from the one side surface of the light guide plate in a direction, which is farther away from the light source, by a third distance, which is greater than the second distance.

29. The display device of claim 27, wherein
the second frame member comprises:
a second extension part which extends in the second direction and is disposed to face the first extension part; and
third and fourth extension parts which are connected to both ends of the second extension part, extend in the first direction to be disposed adjacent to both ends of the first extension part, and are disposed to face each other,
the third frame member comprises:
a fifth extension part extended in the second direction; and
sixth and seventh extension parts which are connected to both ends of the fifth extension part, extend in the first direction to be disposed adjacent to both ends of the first extension part, and are disposed to face each other,
wherein the fifth extension part is disposed under the second extension part to overlap the second extension part,
the sixth extension part is disposed under the third extension part to overlap the third extension part, and
the seventh extension part is disposed under the fourth extension part to overlap the fourth extension part.

30. The display device of claim 29, wherein
the second extension part comprises:
a second_first extension part disposed to face the first_first extension part and having the first height in the third direction, a long side in the second direction, and a short side in the third direction;
a second_second extension part spaced apart downwardly from an upper portion of the second_first extension part by the second height to be connected to an inner surface of the second_first extension part, and having a long side in the second direction and a short side in the first direction; and
a second inclination part connected to the second_second extension part and having a predetermined inclination surface in the first direction,
the third extension part comprises:
a third_first extension part having the first height in the third direction, a long side in the first direction, and a short side in the third direction;
a third_second extension part spaced apart from an upper portion of the third_first extension part by the second height to be connected to an inner surface of the third_first extension part, and having a long side in the first direction and a short side in the second direction; and
a third inclination part connected to the third_second extension part and having a predetermined inclination surface in the second direction, and
the fourth extension part comprises:
a fourth_first extension part having the first height in the third direction, a long side in the first direction, and a short side in the third direction;
a fourth_second extension part spaced apart downwardly from an upper portion of the fourth_first extension part by the second height to be connected to an inner surface of the fourth_first extension part, and having a long side in the first direction and a short side in the second direction; and
a fourth inclination part connected to the fourth_second extension part and having a predetermined inclination surface in the second direction.

31. The display device of claim 30, wherein
the fifth extension part comprises:
a fifth_first extension part having a long side in the second direction and a short side in the third direction; and
a fifth_second extension part connected to a lower portion of an inner surface of the fifth_first extension part and having a long side in the second direction and a short side in the first direction, the sixth extension part comprises:
a sixth_first extension part having a long side in the first direction and a short side in the third direction; and
a sixth_second extension part connected to a lower portion of an inner surface of the sixth_first extension part and having a long side in the first direction and a short side in the second direction, and
the seventh extension part comprises:
a seventh_first extension part having a long side in the first direction and a short side in the third direction; and
a seventh_second extension part connected to a lower portion of an inner surface of the seventh_first extension part and having a long side in the first direction and a short side in the second direction.

32. The display device of claim 31, further comprising:
a second reflective member disposed on an inclination surface of the sixth_first extension part and an inclination surface of the seventh_first extension part,
wherein the inner surface of the sixth_first extension part, which does not overlap the sixth_second extension part, comprises the inclination surface inclined outward from the sixth_first extension part at a predetermined angle with respect to the upward direction,
the inner surface of the seventh_first extension part, which does not overlap the seventh_second extension part, comprises the inclination surface inclined outward from the seventh_first extension part at a predetermined angle with respect to the upward direction, and
the inclination surface of the sixth_second extension part and the inclination surface of the seventh_second extension part are inclined at the predetermined angle in a range of about 30 degrees to about 60 degrees with respect to the upward direction.

33. The display device of claim 31, wherein
an upper surface and an outer surface of the fifth_first extension part are respectively disposed on a lower surface of the second_second extension part and the inner surface of the second_first extension part under the second_second extension part, an upper surface and an outer surface of the sixth_first extension part are respectively disposed on a lower surface of the third_second extension part and the inner surface of the third_first extension part under the third_second extension part, and an upper surface and an outer surface of the seventh_first extension part are respectively disposed on a lower surface of the fourth_second extension part and the inner surface of the fourth_first extension part under the fourth_second extension part.

34. The display device of claim 31, wherein a predetermined area of one side portion of the light guide plate in the first direction is disposed on the fifth_second extension part, the second_second extension part is disposed on the predetermined area of the side portion of the light guide plate in the first direction, predetermined areas of both side portions of the light guide plate in the second direction are respectively disposed on the sixth_second extension part and the seventh_second extension part, the third_second extension part and the fourth_second extension part are respectively disposed on the predetermined areas of the both side portions of the light guide plate, predetermined areas of both side portions of the optical sheet in the first direction are respectively disposed on the first_second extension part and the second_second extension part, and predetermined areas of both side portions of the optical sheet in the second direction are respectively disposed on the third_second extension part and the fourth_second extension part.

35. The display device of claim 26, further comprising:

a plurality of scattering patterns disposed on a lower surface of the light guide plate substantially in a matrix form, wherein the scattering patterns reflect and diffuse the light incident thereto, and the scattering patterns comprise:
  a plurality of first scattering patterns arranged in both side portions of the light guide plate in the second direction vertical to the first direction; and
  a plurality of second scattering patterns arranged between the both side portions of the light guide plate in the second direction,
  wherein the second scattering patterns have a size which gradually becomes larger along the first direction.

36. The display device of claim 35, wherein the first scattering patterns have a size larger than the largest size of the second scattering patterns.

37. The display device of claim 35, wherein the first scattering patterns have a size which gradually becomes larger along the first direction, and the first scattering patterns arranged in a same column as the second scattering patterns in the second direction have the size greater than the size of the second scattering patterns arranged in the same column.

\* \* \* \* \*